United States Patent
Hattori et al.

(10) Patent No.: US 10,421,840 B2
(45) Date of Patent: Sep. 24, 2019

(54) SILICONE-MODIFIED POLYIMIDE RESIN COMPOSITION OF SOLVENT FREE TYPE

(71) Applicant: Shin-Etsu Chemical Co., Ltd., Tokyo (JP)

(72) Inventors: Hatsuhiko Hattori, Annaka (JP); Yoshinori Yoneda, Tokyo (JP); Tomoya Kanai, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 185 days.

(21) Appl. No.: 15/621,358

(22) Filed: Jun. 13, 2017

(65) Prior Publication Data

US 2017/0355825 A1     Dec. 14, 2017

(30) Foreign Application Priority Data

Jun. 14, 2016 (JP) ................. 2016-117586

(51) Int. Cl.
*C08G 77/455*   (2006.01)
*C09D 7/61*     (2018.01)
(Continued)

(52) U.S. Cl.
CPC .......... *C08G 77/455* (2013.01); *C08F 236/20* (2013.01); *C08G 73/106* (2013.01);
(Continued)

(58) Field of Classification Search
CPC ..... C08G 77/455; C09D 183/10; C08L 83/10; C08F 283/124; C08F 283/128; C08K 3/36
See application file for complete search history.

(56) References Cited

U.S. PATENT DOCUMENTS 4,972,005 A * 11/1990 Aoki ................... C08F 283/124
522/99
7,432,313 B2  10/2008 Yoneda et al.
(Continued)

FOREIGN PATENT DOCUMENTS

JP    2006-104447 A      4/2006
JP    2017222745 A  * 12/2017  ............... C09D 7/61

OTHER PUBLICATIONS

Ciba Darocur 1173 Data Sheet, Coating Effects Segment. (Year: 2001).*

*Primary Examiner* — Michael M Dollinger
(74) *Attorney, Agent, or Firm* — Birch, Stewart, Kolasch & Birch, LLP

(57) ABSTRACT

Disclosed herein is a silicone-modified polyimide resin composition of solvent free type. The composition is suitable for use as an adhesive and a coating material which are capable of hardening upon irradiation with ultraviolet rays and/or visible rays. Also, it is saved from drooling even in the case of light filling with an inorganic compound and it is saved from bubble entrapment and nonuniformity at the time of application with heavy filling. It further exhibits good moldability due to its thixotropic properties. Moreover, it exhibits improved adhesion to polyolefin resins without impairing the past properties. Finally, it gives rise to a cured product which is not excessively hard, with a low elastic modulus, despite filling with an inorganic compound. The composition of the present invention includes components (A) to (B) listed below and is characterized by being fluid at 25° C. and free of solvent:
(A) silicone-modified polyimide resin;
(B) polymerizable compound;
(C) polymerization initiator,
(D) hydrophobic fumed silica; and (Continued)

(E) adhesion auxiliary agent.

14 Claims, 3 Drawing Sheets

(51) Int. Cl.
| | |
|---|---|
| *C09D 7/47* | (2018.01) |
| *C08K 3/36* | (2006.01) |
| *C09D 183/10* | (2006.01) |
| *C09J 11/04* | (2006.01) |
| *C09J 183/10* | (2006.01) |
| *C08F 236/20* | (2006.01) |
| *C08G 73/10* | (2006.01) |
| *C08L 51/08* | (2006.01) |
| *C08G 77/12* | (2006.01) |
| *C08G 77/20* | (2006.01) |

(52) U.S. Cl.
CPC ..... *C08G 73/1042* (2013.01); *C08G 73/1075* (2013.01); *C08K 3/36* (2013.01); *C08L 51/085* (2013.01); *C09D 7/47* (2018.01); *C09D 7/61* (2018.01); *C09D 183/10* (2013.01); *C09J 11/04* (2013.01); *C09J 183/10* (2013.01); *C08G 77/12* (2013.01); *C08G 77/20* (2013.01)

(56) References Cited

U.S. PATENT DOCUMENTS

| | | | | |
|---|---|---|---|---|
| 2002/0188069 | A1* | 12/2002 | Sugo | C08G 77/455 525/100 |
| 2006/0052476 | A1* | 3/2006 | Yoneda | C08G 73/106 522/99 |
| 2006/0084714 | A1* | 4/2006 | Yoneda | C03C 17/30 522/172 |
| 2009/0186295 | A1* | 7/2009 | Win | C08G 73/106 430/270.1 |
| 2009/0234072 | A1* | 9/2009 | Nakagawa | C08L 83/06 525/100 |
| 2010/0056730 | A1* | 3/2010 | Yoneda | C08G 59/4042 525/408 |
| 2010/0118261 | A1* | 5/2010 | McGee | C08F 283/124 351/159.33 |
| 2015/0017114 | A1* | 1/2015 | Braun | A61Q 19/00 424/78.02 |

* cited by examiner

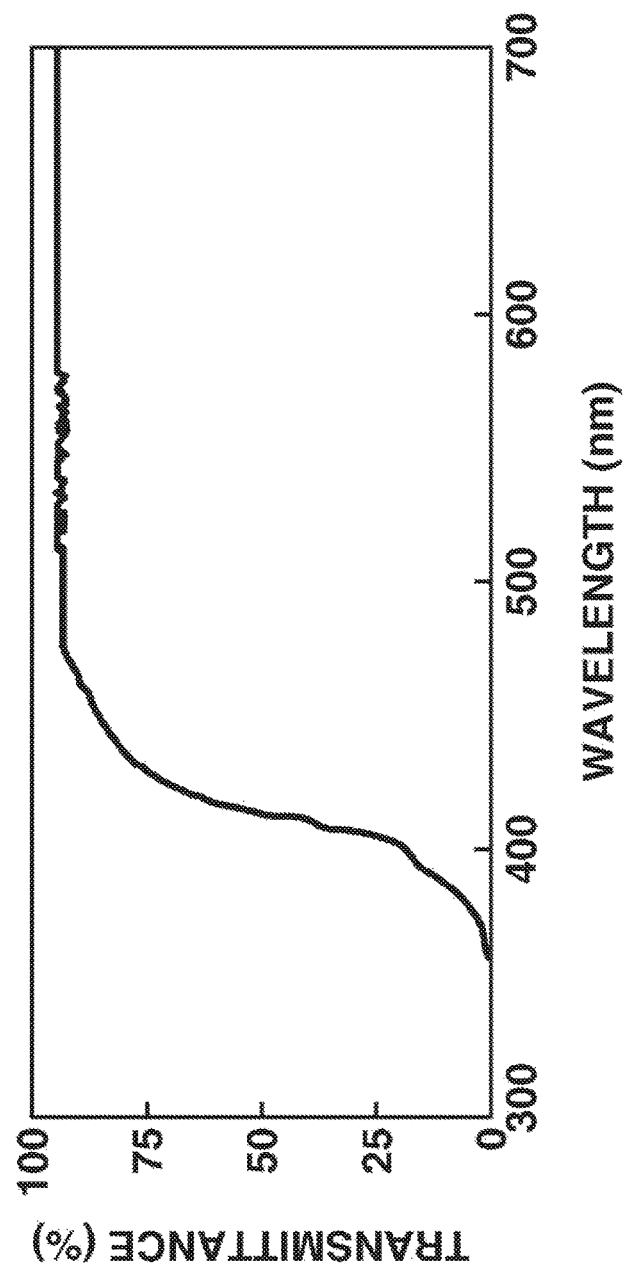

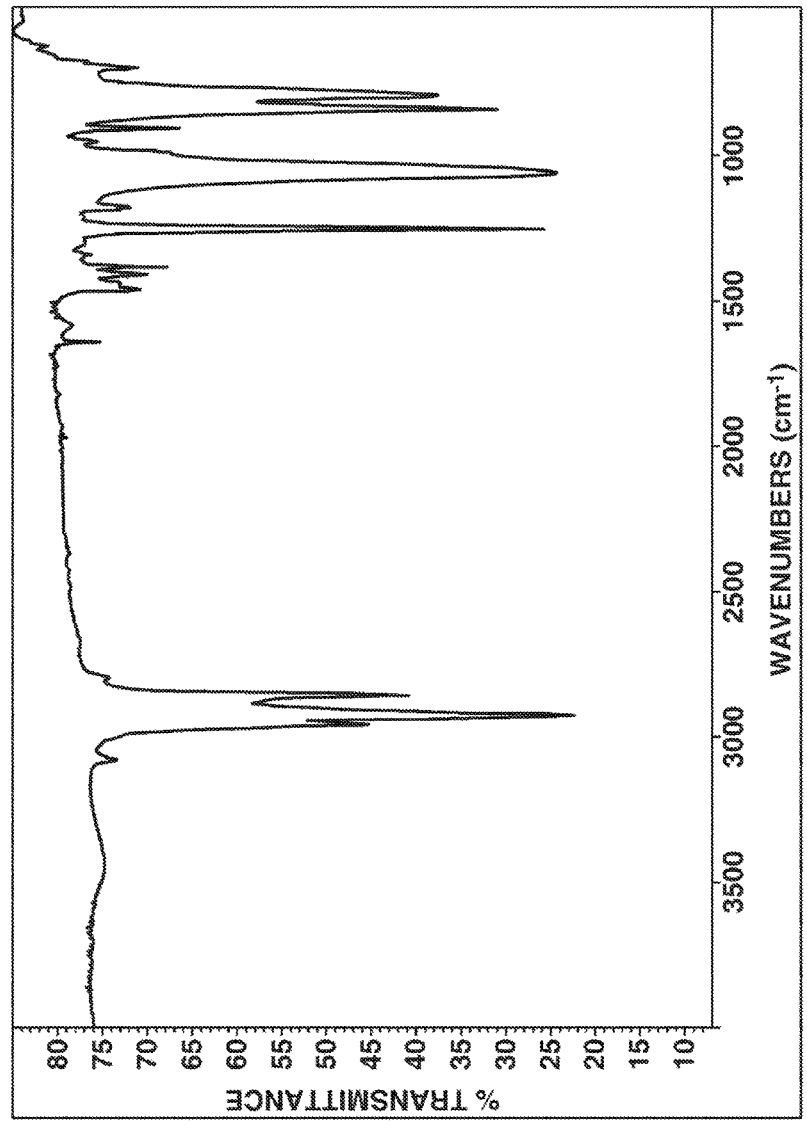

SILICONE-MODIFIED POLYIMIDE RESIN COMPOSITION OF SOLVENT FREE TYPE

CROSS-REFERENCE TO RELATED APPLICATION

This non-provisional application claims priority under 35 U.S.C. § 119(a) on Patent Application No. 2016-117586 filed in Japan on Jun. 14, 2016, the entire contents of which are hereby incorporated by reference.

TECHNICAL FIELD

The present invention relates to a composition containing a silicone-modified polyimide resin which is essentially free of solvent and assumes no color in the visible light region. To be more specific, it relates to a solvent free type composition containing a silicone-modified polyimide resin. The composition has thixotropic properties despite its fluidity at normal temperature and also by capability of hardening on irradiation with ultraviolet rays and/or visible rays.

BACKGROUND ART

Polyimide resins are generally superior in heat resistance and electrical insulating properties, and hence they find use as a raw material for printed circuit boards and heat-resistant adhesive tapes. It also finds use as a resin varnish to be formed into surface-protective film and interlayer insulating film for electrical components and semiconductor materials. Unfortunately, polyimide resins are only soluble in limited kinds of solvents, and consequently they are usually used in such a way that polyamic acid, which is a precursor of polyimide and soluble comparatively easily in various organic solvents, is applied to a substrate and this coating step is followed by high temperature treatment (for cyclodehydration) to give a cured product of polyimide resin.

In order to cope with the process just mentioned above, there has increased a demand for adhesives and coating materials formed from polyimide resin capable of hardening with ultraviolet rays, because the hardening of polyimide resin with ultraviolet rays or visible rays proceeds at a low temperature for a short time. (See Patent Document 1: JP-A 2006-104447.) In addition, the polyimide resin to be used as adhesives and coating materials needs thixotropic properties so that it does not suffer from drooling and cobwebbing and also from spreading at the time of application. Also, there is recently an increasing attention to adhesion to polyolefins having a low surface free energy so as to explore adhesion between different materials, such as between metal and plastics.

CITATION LIST

Patent Document 1: JP-A 2006-104447

SUMMARY OF INVENTION

It is an object of the present invention to provide a silicone-modified polyimide resin composition of solvent free type. The composition is suitable for use as an adhesive and a coating material which are capable of hardening upon irradiation with ultraviolet rays and/or visible rays. Also, it is saved from drooling even in the case of light filling with an inorganic compound and it is saved from bubble entrapment and nonuniformity at the time of application with heavy filling. It further exhibits good moldability due to its thixotropic properties. Moreover, it exhibits improved adhesion to polyolefin resins without impairing the past properties. Finally, it gives rise to a cured product which is not excessively hard, with a low elastic modulus, despite filling with an inorganic compound.

The present inventors carried out an extensive investigation which led to the finding of a silicone-modified polyimide resin composition of solvent free type which is superior in handleability and free of the foregoing problems. This finding is the basis of the present invention.

Thus, the present invention covers the following.

[1] A silicone-modified polyimide resin composition of solvent free type which is fluid at 25° C. and free of solvent, the composition comprising:

(A) 100 parts by weight of a silicone-modified polyimide resin which is represented by the formula (1) below:

$$E_e\text{-}F_f\text{-}G_g \quad (1)$$

in the formula (1), E, F, and G are randomly bonded repeating units, E is a divalent residue derived from diamino-modified silicone represented by the formula (2) below, F is a residue derived from tetracarboxylic acid dianhydride represented by the formula (3) below, and G is a divalent residue derived from diamine, and the sum of e+f+g is 100 mol %, the molar ratio of f/(e+g) is from 0.8 to 1.2,

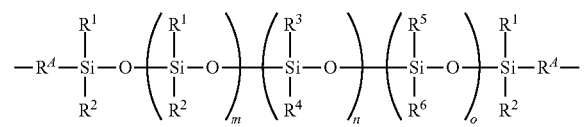

(2)

in the formula (2), $R^A$ is a substituted or unsubstituted divalent hydrocarbon group having 1 to 10 carbon atoms, $R^1$ and $R^2$ are each, independent from each other, a substituted or unsubstituted monovalent hydrocarbon group having 1 to 10 carbon atoms, $R^3$ and $R^4$ are each, independent from each other, a substituted or unsubstituted monovalent hydrocarbon group having 1 to 10 carbon atoms, $R^5$ and $R^6$ are each, independent from each other, an organic group selected from a substituted or unsubstituted alkyl group, aryl group, or aralkyl group, having 1 to 16 carbon atoms, and each of m, n, and o is an integer from 0 to 20, n+o≥1 and m+n+o=1 to 60, $$-I_m-X-I_m- \quad (3)$$

in the formula (3), $I_m$ is a cyclic group having a cyclic imide structure at its end, and X is a single bond, oxygen, sulfur, sulfide group, sulfonic group, carbonyl group, $-NR^N-$ (wherein $R^N$ is a straight, branched, or cyclic monovalent hydrocarbon group having 1 to 12 carbon atoms), $-CR^B{}_2-$ (wherein $R^B$ is, independent form each other, a hydrogen atom or a substituted or unsubstituted monovalent hydrocarbon group having 1 to 12 carbon atoms), $-R^{Ar}{}_h-$ (wherein $R^{Ar}$ is a divalent arylene group having 6 to 12 carbon atoms, and h is an integer of 1 to 6), a trivalent or tetravalent group derived from an arylene group with one or two hydrogen atoms eliminated, $-R^{Ar}{}_h(OR^{Ar})_i-$ (wherein $R^{Ar}$ and h are defined as above and i is an integer of 1 to 5), a linear, branched, or cyclic alkylene group having 1 to 12 carbon atoms, a trivalent group derived from the alkylene group with one hydrogen atom eliminated, or a divalent to tetravalent organic group selected from arylenealkylene groups;

(B) a polymerizable compound: 100 to 2,000 parts by weight, (C) a polymerization initiator: 0.1 to 30 parts by weight per 100 parts by weight of the total content of the components (A) and (B), (D) a hydrophobic fumed silica: 1 to 50 parts by weight per 100 parts by weight of the total content of the components (A) and (B), and (E) an adhesion auxiliary agent: 0.1 to 5 parts by weight per 100 parts by weight of the total content of the components (A) and (B).

[2] The silicone-modified polyimide resin composition of solvent free type of [1], wherein $I_m$ is selected from the groups shown below:

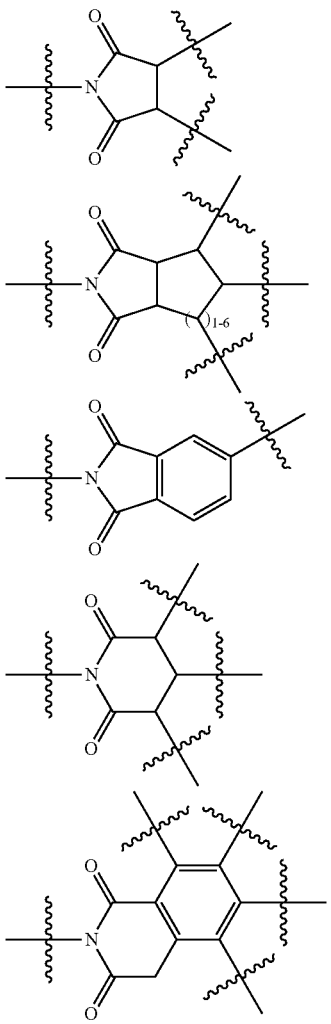

wherein the bonding hands marked with a wavy line function such that the one bonding to the nitrogen atom bonds to E or G and the other bonds to X.

[3] The silicone-modified polyimide resin composition of solvent free type of [1] or [2], wherein the component (B) is a radical-polymerizable compound.

[4] The silicone-modified polyimide resin composition of solvent free type of [3], wherein the component (B) is a (meth)acrylate ester compound.

[5] The silicone-modified polyimide resin composition of solvent free type of any one of [1] to [4], wherein the component (C) is a radical initiator capable of thermal decomposition or an initiator to be activated by irradiation.

[6] The silicone-modified polyimide resin composition of solvent free type of any one of [1] to [5], wherein the component (D) is hydrophobic fumed silica having a bulk density no higher than 1 g/ml, a mean primary particle diameter of from 1 to 100 nm, and a BET specific surface area of from 100 to 300 m$^2$/g.

[7] The silicone-modified polyimide resin composition of solvent free type of any one of [1] to [6], wherein the component (B) is a compound represented by the formula (4) below:

in the formula (4), I is a monovalent unsaturated hydrocarbon group having a polymerizable group at each end and having 6 to 20 carbon atoms, J is a divalent siloxane unit represented by the formula (5), K is a divalent hydrocarbon group having 6 to 20 carbon atoms, and jk is an integer from 1 to 10,

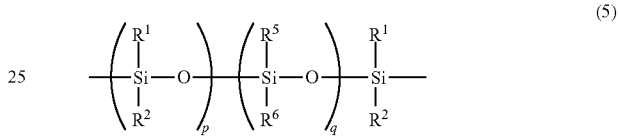

in the formula (5), $R^1$, $R^2$, $R^5$, and $R^6$ are defined as above, p is an integer from 1 to 60, and q is an integer from 0 to 60, with p+q≥1 and p+q=1 to 60.

[8] The silicone-modified polyimide resin composition of solvent free type of any one of [1] to [7], having a viscosity of from 3 to 1,000 Pa·s at 25° C.

[9] The silicone-modified polyimide resin composition of solvent free type of any one of [1] to [8], further comprising (F) a modifying additive.

[10] The silicone-modified polyimide resin composition of solvent free type of any one of [1] to [9], further comprising (G) a leveling agent.

[11] The silicone-modified polyimide resin composition of solvent free type of any one of [1] to [10], further comprising (H) a dye as the component.

[12] An adhesive composed of the composition defined in any one of claims [1] to [11].

[13] A coating agent composed of the composition defined in any one of [1] to [11].

[14] A cured product of silicone-modified polyimide resin which is obtained from the silicone-modified polyimide resin composition of solvent free type of any one of [1] to [11], by curing with ultraviolet rays and/or visible rays, wherein coating film formed by the cured product has a storage elastic modulus of from 1 to 500 MPa.

[15] A cured product of silicone-modified polyimide resin which is obtained from the silicone-modified polyimide resin composition of solvent free type of any one of [1] to [10] by curing with ultraviolet rays and/or visible rays, wherein coating film formed by the cured product has a light transmittance at least 80% in the visible region and also has a color specified by the L*a*b* colorimetric system such that L* is at least 80%, a* is at least −10% and lower than 10%, and b* is at least −10% and lower than 10%.

Advantageous Effects of Invention

The silicone-modified polyimide-resin-containing composition of solvent free type of the present invention is fluid at normal temperature and thixotropic, which contributes to its easy handleability. It gives rise to a cured product upon irradiation with ultraviolet rays and/or visible rays, which finds use as an adhesive and coating material superior in adhesion despite its low elastic modulus. Moreover, it exhibits improved adhesion to polyolefin-based polymeric compounds without impairing the existing performance.

BRIEF DESCRIPTION OF THE DRAWINGS

FIG. 2 is a transmittance spectrum of the silicone-modified polyimide resin obtained in Synthesis Example 5; and FIG. 3 is an infrared absorption spectrum of the polysilalkylenepolysiloxane compound obtained in Synthesis Example 7.

DESCRIPTION OF EMBODIMENTS

Figure 1:
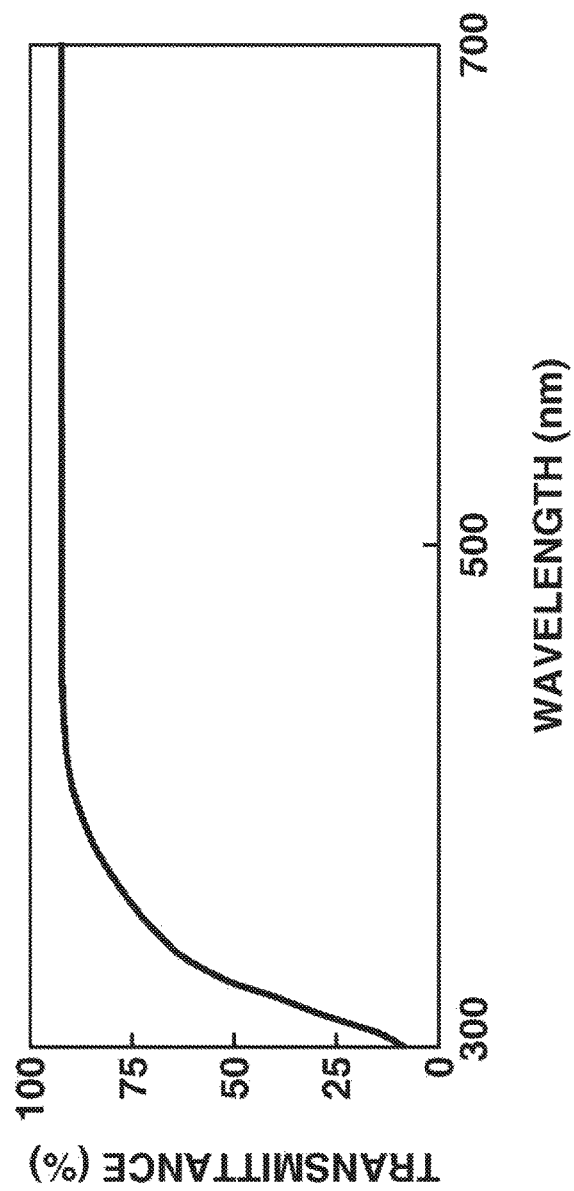
FIG. 1 is a transmittance spectrum of the silicone-modified polyimide resin obtained in Synthesis Example 1.

The following is a detailed description of the present invention.

According to the present invention, the silicone-modified polyimide-containing composition of solvent free type is characterized by being composed of the components (A) to (E) defined below, being fluid at 25° C., and being free of solvent.

(A) Silicone-modified polyimide resin,
(B) Polymerizable compound,
(C) Polymerization initiator,
(D) Hydrophobic fumed silica, and
(E) Adhesion auxiliary agent.

(A) Silicone-Modified Polyimide Resin

A silicone-modified polyimide as the component (A) is the base polymer of the composition of the present invention. The one represented by the formula (1) below can be used.

(A) silicone-modified polyimide resin in an amount of 100 parts by weight which is represented by the formula (1) below:

(in the formula (1), E, F, and G are randomly bonded repeating units, with E being a divalent residue derived from diamino-modified silicone represented by the formula (2) below, F being a residue derived from tetracarboxylic acid dianhydride represented by the formula (3) below, and G being a divalent residue derived from diamine, and the sum of e+f+g is 100 mol %, the molar ratio of f/(e+g) is from 0.8 to 1.2.).

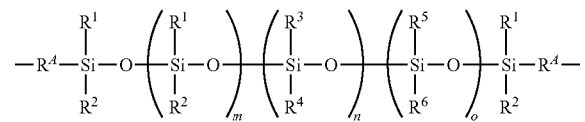

(In the formula (2), $R^A$ is a substituted or unsubstituted divalent hydrocarbon group having 1 to 10 carbon atoms, $R^1$ and $R^2$ are each, independent from each other, a substituted or unsubstituted monovalent hydrocarbon group having 1 to 10 carbon atoms, $R^3$ and $R^4$ are each, independent from each other, a substituted or unsubstituted monovalent hydrocarbon group having 1 to 10 carbon atoms, $R^5$ and $R^6$ are each, independent from each other, an organic group selected from a substituted or unsubstituted alkyl group, aryl group, or aralkyl group, having 1 to 16 carbon atoms, and each of m, n, and o is an integer from 0 to 20, n+o≥1 and m+n+o=1 to 60.)

(In the formula (3), $I_m$ is a cyclic group having a cyclic imide structure at its end, and X is a single bond, oxygen, sulfur, sulfide group, sulfonic group, carbonyl group, —$NR^N$— (wherein $R^N$ is a straight, branched, or cyclic monovalent hydrocarbon group having 1 to 12 carbon atoms), —$CR^B{}_2$— (wherein $R^B$ is, independent form each other, a hydrogen atom or a substituted or unsubstituted monovalent hydrocarbon group having 1 to 12 carbon atoms), —$R^{Ar}{}_h$— (wherein $R^{Ar}$ is a divalent arylene group having 6 to 12 carbon atoms, and h is an integer of 1 to 6), a trivalent or tetravalent group derived from an arylene group with one or two hydrogen atoms eliminated, —$R^{Ar}{}_h(OR^{Ar})_i$— (wherein $R^{Ar}$ and h are defined as above and i is an integer of 1 to 5), a linear, branched, or cyclic alkylene group having 1 to 12 carbon atoms, a trivalent group derived from the alkylene group with one hydrogen atom eliminated, or a divalent to tetravalent organic group selected from arylenealkylene groups.)

In the formula (2), $R^A$ is preferably a substituted or unsubstituted, straight, branched, or cyclic divalent hydrocarbon group having 1 to 10 carbon atoms, which may optionally contain hetero atoms such as oxygen and nitrogen atoms, with the aromatic ring optionally containing the hetero atoms. To be more specific, it may be any group selected from methylene group, 1,2-ethylene group, 1,3-propylene group, 1,3-butylene group, 1,4-butylene group, 1,3-pentylene group, 1,4-pentylene group, 1,5-pentylene group, 1,6-hexylene group, 1,7-heptylene group, 1,8-octylene group, 1,9-nonylene group, 1,10-decylene group, 2-(3-prop-1-oxy)etha-1-ylene group, 3-(3-prop-1-oxy)propa-1-ylene group, 4-(3-prop-1-oxy)buta-1-ylene group, 5-(3-prop-1-oxy)penta-1-ylene group, 6-(3-prop-1-oxy)hexa-1-ylene group, 1,3-cyclohexylene group, 1,4-cyclohexylene group, 1,3-cycloheptylene group, 1,4-cycloheptylene group, N,N-piperidinylene group, and 1,4-dioxacyclohexa-2,5-ylene group. Preferable among them is 1,3-propylene group from the standpoint of availability.

$R^1$ and $R^2$ are preferably substituted or unsubstituted, straight, branched, or cyclic monovalent alkyl groups having 1 to 10 carbon atoms, which are independent from each other. To be more specific, examples of $R^1$ and $R^2$ include alkyl groups (selected from methyl group, ethyl group, propyl group, isopropyl group, butyl group, isobutyl group, tert-butyl group, pentyl group, neopentyl group, hexyl group, cyclohexyl group, heptyl group, octyl group, nonyl group, decyl group, and decaryl group) and fluorine-substituted alkyl groups. Preferable among them are lower alkyl groups such as methyl group, ethyl group, and propyl group.

$R^3$ and $R^4$ are preferably substituted or unsubstituted, straight, branched, or cyclic alkyl groups or alkenyl groups, having 1 to 10 carbon atoms, which are independent from each other. To be more specific, examples of $R^3$ and $R^4$ include alkyl groups such as methyl group, ethyl group, propyl group, butyl group, pentyl group, hexyl group, heptyl group, octyl group, nonyl group, decyl group, and decaryl group and alkenyl groups such as vinyl group, allyl group, propenyl group, isopropenyl group, butenyl group, hexenyl group, cyclohexenyl group, and octenyl group, with their hydrogen atoms partly or entirely substituted with fluorine atoms. Their typical examples include 3,3,3-trifluoropropyl group and 3,3,4,4,4-pentafluorobutyl group. Their preferable examples include methyl group, ethyl group, propyl group, vinyl group, and 3,3,3-trifluoropropyl group.

$R^5$ and $R^6$ are preferably straight, branched, or cyclic alkyl groups having 1 to 10 carbon atoms, monovalent aryl groups having 5 to 12 carbon atoms, or aralkyl groups having 7 to 16 carbon atoms, which are independent from each other. Examples of the alkyl groups include those mentioned above. The aryl groups include those selected from phenyl group, 2-methylphenyl group, 3-methylphenyl group, 4-methylphenyl group, 2,3-dimethylphenyl group, 2,4-dimethylphenyl group, 2,6-dimethylphenyl group, 3,4-dimethylphenyl group, 3,5-dimethylphenyl group, 2,3,4-trimethylphenyl group, 2,3,5-trimethylphenyl group, 2,4,6-trimethylphenyl group, and indenyl group. Examples of the aralkyl groups include those selected from phenylmethylene group, 2-phenyl-1-ethylene group, 3-phenyl-1-propylene group, phenylbutylene group, 3-phenyl-1-pentylene group, 4-phenyl-1-pentylene group, 5-phenyl-1-pentylene group, 6-phenyl-1-hexylene group, 7-phenyl-1-heptylene group, 8-phenyl-1-octylene group, 9-phenyl-1-nonylene group, 10-phenyl-1-decylene group, and 2,3-dihydro-1H-indenylene group. They also include those which have their hydrogen atoms partly or entirely substituted with fluorine atoms. Such groups are exemplified by 3,3,3-trifluoropropyl group and 3,3,4,4,4-pentafluorobutyl group. More preferable examples of $R^5$ and $R^6$ include methyl group, phenyl group, 3,3,3-trifluoropropyl group, 2-phenyl-1-ethyl group, and 3-phenyl-2-propyl group. Incidentally, the aryl group and aralkyl group may contain any hetero atoms in the aromatic ring.

Each of m, n, and o is an integer from 0 to 20, m is 0 to 20, preferably 4 to 10, n is 0 to 20, preferably 4 to 10, and o is 0 to 20, preferably 0 to 5. These are restricted by n+o≥1, n+o=1 to 40, preferably 1 to 10, and m+n+o=1 to 60, preferably 5 to 20.

There are shown below the typical examples of the groups represented by the formula (2). Incidentally, Ph is a phenyl group, and m, n, and o are defined as above.

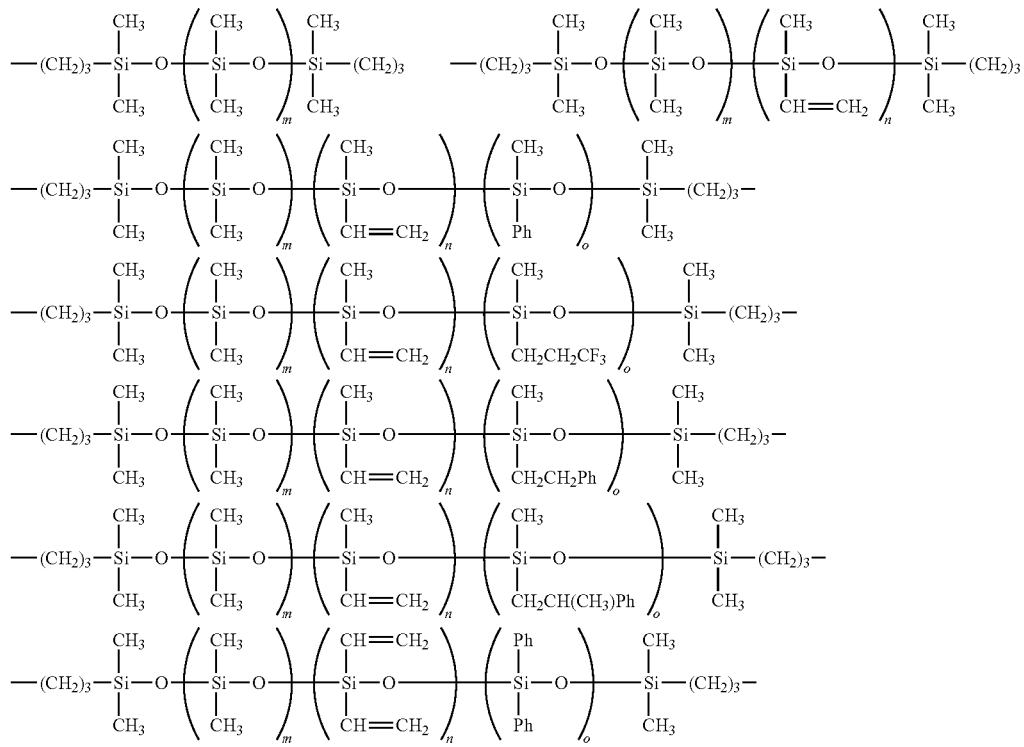

F is a residue derived from tetracarboxylic acid dianhydride which is represented by the formula (3) below:

$$-I_m-X-I_m- \qquad (3)$$

(in the formula (3), $I_m$ is a cyclic group having a cyclic imide structure at its end, and X is a single bond (which binds together the two of $I_m$ through the single bond), oxygen, sulfur, sulfide group, sulfonic group, carbonyl group, —$NR^N$— (wherein $R^N$ is a straight, branched, or cyclic monovalent hydrocarbon group having 1 to 12 carbon atoms), —$CR^B{}_2$— (wherein $R^B$ is, independent form each other, a hydrogen atom or a substituted or unsubstituted monovalent hydrocarbon group having 1 to 12 carbon atoms), —$R^{Ar}{}_h$— (wherein $R^{Ar}$ is a divalent arylene group having 6 to 12 carbon atoms, and h is an integer of 1 to 6), a trivalent or tetravalent group derived from an arylene group with one or two hydrogen atoms eliminated, —$R^{Ar}{}_h$(O$R^{Ar}$)$_i$— (wherein $R^{Ar}$ and h are defined as above and i is an integer of 1 to 5), a linear, branched, or cyclic alkylene group having 1 to 12 carbon atoms, a trivalent group derived from the alkylene group with one hydrogen atom eliminated, or a divalent to tetravalent organic group selected from arylenealkylene groups.).

$I_m$ in the formula (3), which has a cyclic imide structure derived from tetracarboxylic acid dianhydride, is a saturated or unsaturated straight, branched, or cyclic group having a cyclic imide structure at its end. This group may be selected from those shown in the formula below, in which the hand marked with a wavy line indicates the bonding hand (the same shall apply hereinafter). Incidentally, the bonding hand extending from the carbon atom on the ring, excluding the bonding hand extending from the nitrogen atom, serves to bond the functional group X at one or two positions.

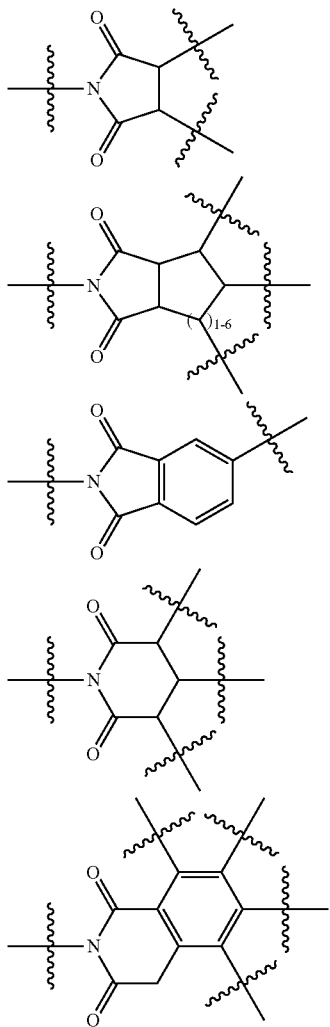

However, is not applicable in the case where X in the formula (3) is a single bond which binds the carbon atom on one $I_m$ to the carbon atom on another $I_m$. The examples of X in such a case are shown below. Incidentally, the hand marked with a wavy line indicates the bonding hand for other groups.

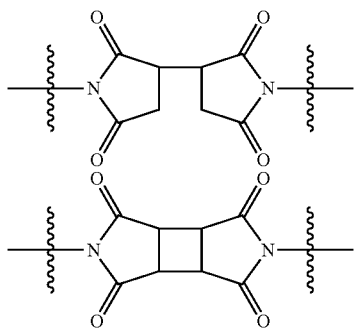

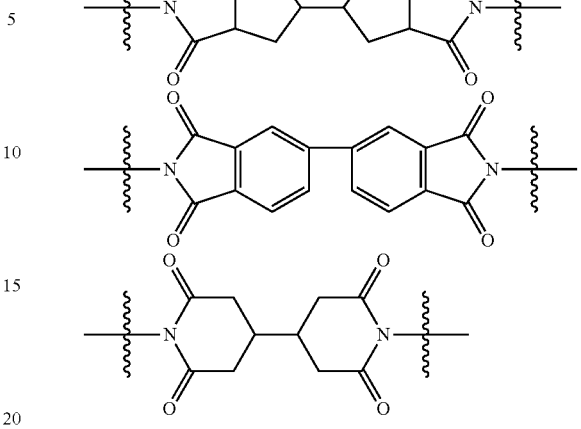

In the formula (3) above, $R^N$ is a monovalent linear, branched, or cyclic hydrocarbon group having 1 to 12 carbon atoms, which includes the following, for example. Such alkyl groups as methyl group, ethyl group, 1-propyl group, 2-propyl group, 1-butyl group, 2-butyl group, 1-pentyl group, 2-pentyl group, 3-pentyl group, 1-hexyl group, 2-hexyl group, 3-hexyl group, 1-heptyl group, 2-heptyl group, 3-heptyl group, 4-heptyl group, 2-methyl-1-heptyl group, 1-octyl group, 2-octyl group, 3-octyl group, 4-octyl group, and 2-ethyl-1-hexyl group. Such aryl groups as phenyl group, 2-methylphenyl group, 3-methylphenyl group, 4-methylphenyl group, 2,3-dimethylphenyl group, 2,4-dimethylphenyl group, 2,6-dimethylphenyl group, 3,4-dimethylphenyl group, 3,5-dimethylphenyl group, 2,3,4-trimethylphenyl group, 2,3,5-trimethylphenyl group, 2,4,6-trimethylphenyl group, indenyl group, 1-naphthyl group, 2-naphthyl group, 1,2,3,4-tetrahydro-4H-naphtha-1-yl group, and 1,2,3,4-tetrahydro-4H-naphtha-2-yl group. These alkyl groups and aryl groups may have their hydrogen atoms partly or entirely substituted with fluorine atoms. Examples of such substituted compounds include 3,3,3-trifluoropropyl group, 3,3,4,4,4-pentafluorobutyl group, 3,3,4,4,5,5,6,6,6-nonafluorohexyl group, 3,3,4,4,5,5,6,6,7,7,7-undecafluoroheptyl group, and 3,3,4,4,5,5,6,6,7,7,8,8,8-tridecafluorooctyl group. Preferable among them are methyl group, phenyl group, and 3,3,3-trifluoropropyl group.

In the formula (3) above, $R^B$ is, independent form each other, a hydrogen atom or an unsubstituted monovalent hydrocarbon group having 1 to 12 carbon atoms, which may have their hydrogen atoms partly or entirely substituted with fluorine atoms. Examples of such groups include alkyl groups and fluorine-substituted alkyl groups such as methyl group, ethyl group, propyl group, trifluoromethyl group, 3,3,3-trifluoropropyl group, and cyclohexyl group; aralkyl groups and fluorine-substituted aralkyl groups such as ($CH_2CH_2C_6H_5$) and ($CH_2CH_2C_6F_5$); and aryl groups and fluorine-substituted aryl groups such as phenyl group, naphthyl group, and perfluorophenyl group. Preferable among them are hydrogen atom, methyl group, trifluoromethyl group, and phenyl group.

In the formula (3) above, $R^{Ar}$ is an unsubstituted divalent arylene group having 6 to 12 carbon atoms, which may have the hydrogen atoms on the skeleton partly or entirely substituted with fluorine atoms or which may have the carbon atoms of the skeleton partly substituted with hetero atoms.

Preferable examples of $R^{Ar}$ are shown below, in which sub represents a substituent selected from hydrogen atom, hydroxyl group, sulfide group, 2,3-oxo-1-propyl group, methoxy group, ethoxy group, t-butoxy group, methyl group, ethyl group, propyl group, t-butyl group, N,N-dimethylamino group, cyano group, methoxycarbonyl group, ethoxycarbonyl group, formyl group, methylcarbonyl group, ethylcarbonyl group, and fluorine atom. The number of substituents is from 1 to 4.

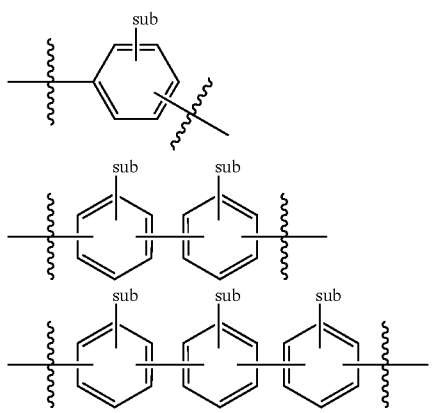

h is an integer of 1 to 6. $R^{Ar}$ and $I_m$ may be joined together at one place or joined together directly at two places of $I_m$. Examples include the following groups.

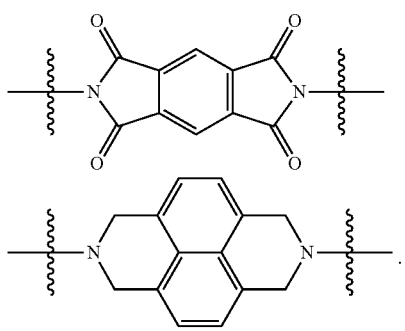

In the formula (3) above, $R^{Ar}$ and h have the same meaning as above and i is an integer of 1 to 5. Such groups include the following, for example. Incidentally, —O— may be bonded at any position and the number of bond is from 1 to 4.

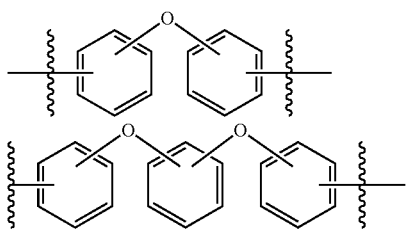

The linear, branched, or cyclic alkylene group having 1 to 8 carbon atoms, the trivalent group derived from the alkylene group with one hydrogen atom eliminated, and the divalent arylenealkylene group having 6 to 12 carbon atoms may have its hydrogen atoms partly substituted with a monovalent alkyl group having 1 to 6 carbon atoms, a monovalent aryl group having 5 to 12 carbon atoms, or a fluorine atom. It may also have the carbon atoms of the skeleton partly substituted with hetero atoms. Such groups include the following, for example.

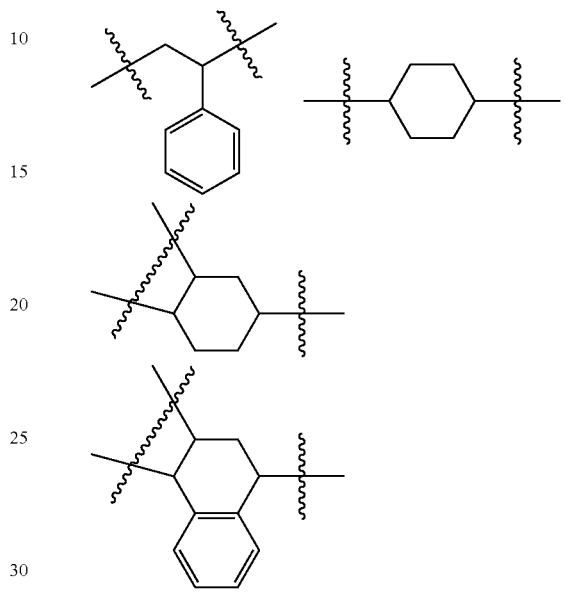

The formula (1) given above has a diamine-derived residue signified by G. The diamine is preferably one which has a low level of light absorption in the ultraviolet to visible regions and also is less likely to form a charge transferring complex after imidization. Therefore, an aliphatic diamine is desirable because it does not prevent the photopolymerization initiator from light absorption; however, a heat-resistant aromatic diamine is also desirable in an amount small enough for the photopolymerization initiator to permit light absorption. Examples of the aliphatic diamine include tetramethylenediamine, 1,4-diaminocyclohexane, and 4,4'-diaminodicyclohexylmethane. Examples of the aromatic diamine include phenylenediamine, 4,4'-diaminodiphenylether, 2,2-bis(4-aminophenyl)propane, and 2,2-bis[4-(4-aminophenoxy)phenyl]propane. They may be used alone or in combination of at least two.

The formula (1) given above implies that the repeating unit indicated by E or G randomly bonds to the repeating unit indicated by F. It is desirable that the compound represented by the formula (1) is blocked with an acid anhydride at each end. e, f, and g are defined as follows. e+f+g=100 mol % and f/(e+g)=0.8 to 1.2, preferably 0.95 to 1.05, in molar ratio.

The component (A) defined by the formula (1) is a silicone-modified polyimide resin which has a weight-average molecular weight of 5,000 to 100,000, preferably 10,000 to 70,000. If the silicone-modified polyimide resin has a weight-average molecular weight lower than the limit specified above, the composition containing it gives rise to a brittle coating film upon curing. By contrast, the silicone-modified polyimide resin having a weight-average molecular weight higher than the limit specified above would be poor in miscibility with the other components (B), (C), and (E), which are a polymerizable compound, polymerization initiator, and adhesion auxiliary agent, respectively. Incidentally, the weight-average molecular weight is expressed in terms of that of polystyrene which is determined by gel permeation chromatography (abbreviated as GPC hereinafter) in which the mobile phase is tetrahydrofuran (THF). (The same shall apply hereinafter.)

The component (A) may be prepared by any known process which includes the following steps. First, a solvent is prepared from tetracarboxylic acid dianhydride, diamine, and diamino-modified silicone. The resulting solvent is kept at a low temperature (approximately 20° C. to 50° C.) for reaction to give polyamic acid, which is a precursor of polyimide resin. The thus obtained solution of polyamic acid is heated to 80° C. to 200° C., preferably 140° C. to 180° C., so that the polyamic acid undergoes ring-closing reaction through dehydration of acid amide. This reaction gives rise to a solution of silicone-modified polyimide resin. The resulting solution is added to a solvent, such as water, methanol, ethanol, and acetonitrile, for precipitation. The resulting precipitates are dried to yield a silicone-modified polyimide resin as desired.

The tetracarboxylic acid dianhydride used in the reaction is preferably one in which the unsaturated bond is not conjugate to the carbonyl group. The diamine-modified silicone is one which has amino groups bonded at both ends of the formula (2) given above. The diamine is preferably one which has been mentioned above.

The ratio f/(e+g) mentioned above is a ratio (in terms of molar ratio) of the number of moles of tetracarboxylic acid dianhydride to the number of moles of diamine and diamino-modified silicone, the ratio being calculated from the amount of the raw materials. In other words, it is possible to properly adjust the ratio of [diamine+diamino-modified silicone (in mole)]/[tetracarboxylic acid dianhydride (in mole)]. The ratio is from 0.8 to 1.2, preferably from 0.95 to 1.05, and more preferably from 0.98 to 1.02. Incidentally, the component (A) may be prepared by using such solvents as N-methyl-2-pyrolidone, cyclohexanone, γ-butyrolactone, and N,N-dimethylacetamide. These solvents may be used in combination with an aromatic hydrocarbon solvent, such as toluene and xylene, which helps to azeotropically remove water as a by-product of imidization. These solvents may be used alone or in combination of at least two.

Incidentally, in order for the silicone-modified polyimide resin to have a properly adjusted molecular weight, it may be incorporated with an acid anhydride, a monofunctional compound, or an aldehyde compound. Examples of the acid anhydride include phthalic anhydride, maleic anhydride, hexahydro-1,3-isobenzofrandione, succinic anhydride, glutaric anhydride, and silicone modified with an acid anhydride having 10 to 60 silicon atoms. Examples of the monofunctional compound include linear, branched, or cyclic alkylamines having 3 to 6 carbon atoms such as aniline, benzylamine, propylamine, butylamine, pentylamine, hexylamine, and cyclohexylamine. Examples of the aldehyde compound include aldehyde compounds containing alkyl having 2 to 6 carbon atoms, such as benzaldehyde, phenylacetaldehyde, propionaldehyde, and butyraldehyde. These additional compounds should be added in an amount up to 2 mol % for the silicone-modified polyimide resin.

Moreover, the imidization may be accomplished with the help of a dehydrating agent and an imidizing catalyst to be added during imidization and optional heating at approximately 50° C. Examples of the dehydrating agent include acid anhydride such as acetic anhydride, propionic anhydride, pivalic anhydride, trifluoroacetic anhydride, and benzoic anhydride. It is preferably used in an amount of 1 to 10 mol for 1 mol of diamine. Examples of the imidizing catalyst include tertiary amines such as triethylamine (Et₃N), diisopropylethylamine (DIPEA), tri-n-butylamine, tri-n-pentylamine, tri-n-hexylamine, tri-n-heptylamine, tri-n-octylamine, N-methylpyrrolidine, N-methylpiperazine, N-methylmorpholine, N,N,N',N'-tetramethylethylenediamine (TMEDA), N-methylimidazole (NMI), pyridine, 2,6-lutidine, 1,3,5-colidine, N,N-dimethylaminopyridine, pyrazine, quinoline, 1,8-diazabicyclo-[5,4,0]-7-undecene (DBU), and 1,4-diazabicyclo-[2,2,2]octane (DABCO). The imidizing catalyst is preferably used in an amount of 0.5 to 10 mol for 1 mol of the dehydrating agent. The imidizing process mentioned above offers an advantage that the reaction solution is exempt from high temperatures during reaction; this prevents the resulting resin from discoloration.

The reaction involving plural kinds of at least one of diamine and tetracarboxylic acid dianhydride has no restrictions on its method. A typical method may consist of the mixing of all raw materials and the subsequent copolymerization. Another typical method may include sequentially adding at least two kinds of diamine or tetracarboxylic acid dianhydride during a series of reactions.

(B) Polymerizable Compound

The component (B) of the present invention is a radical polymerizable compound. To be more specific, it is at least one compound selected from (meth)acrylic acid derivative, alkenyl compound, cycloalkenyl compound, alkynyl compound, styryl compound, indenyl compound, vinylether compound, norbornyl compound, and conjugated or non-conjugated alkadiene compound. Their hydrogen atoms may be partly substituted with fluorine atoms and their carbon atoms may be partly substituted with oxygen atoms.

The (meth)acrylic acid derivative is represented by the formula (6) or (7) below. The formula (6) below is a (meth)acrylic acid ester compound and the formula (7) below is a (meth)acrylic acid amide compound. Incidentally, these compounds may have their hydrogen atoms partly substituted with linear, branched, or cyclic alkyl groups having 1 to 16 carbon atoms and/or cyclic siloxanyl groups having 2 to 60 silicon atoms.

$$CH_2=CR^7C(=O)OR^8 \qquad (6)$$

$$CH_2=CR^7C(=O)NR^8{}_2 \qquad (7)$$

(Wherein $R^7$ is a linear or branched alkyl group having 1 to 10 carbon atoms, and $R^8$ is a linear, branched, or cyclic alkyl group having 1 to 16 carbon atoms, both optionally containing a siloxanyl group having 2 to 60 silicon atoms. Incidentally, the term (meth)acryl used herein is either acryl or methacryl.)

Examples of the compound represented by the formula (6) above includes methyl (meth)acrylate, ethyl (meth)acrylate, propyl (meth)acrylate, butyl (meth)acrylate, t-butyl (meth)acrylate, isobutyl (meth)acrylate, pentyl (meth)acrylate, hexyl (meth)acrylate, heptyl (meth)acrylate, norbornyl (meth)acrylate, isobornyl (meth)acrylate, octyl (meth)acrylate, nonyl (meth)acrylate, decyl (meth)acrylate, undecyl (meth)acrylate, dodecyl (meth)acrylate, tridecyl (meth)acrylate, tetradecyl (meth)acrylate, pentadecyl (meth)acrylate, hexadecyl (meth)acrylate, 2-ethylhexyl (meth)acrylate, cyclopentyl (meth)acrylate, cyclohexyl (meth)acrylate, cycloheptyl (meth)acrylate, cyclooctyl (meth)acrylate, 3,3,3-trifluoropropyl (meth)acrylate, 3,3,4,4,4-pentafluorobutyl (meth)acrylate, 3,3,4,4,5,5,6,6,6-nonafluorohexyl (meth)acrylate, 3,3,4,4,5,5,6,6,7,7,7-undecafluoroheptyl (meth)acrylate, 3,3,4,4,5,5,6,6,7,7,8,8,8-tridecafluorooctyl (meth)acrylate, 2-methoxyethyl (meth)acrylate, 2-(2-methoxyethoxy)ethyl (meth)acrylate, 2-(2-(2- methoxyethoxy)ethoxy)ethyl (meth)acrylate, 2-(2-(2-(2-methoxyethoxy)ethoxy)ethoxy)ethyl (meth)acrylate, 2-(2-(2-(2-(2-methoxyethoxy)ethoxy)ethoxy)ethyl (meth)acrylate, 3-methoxypropyl (meth)acrylate, 3-(3-methoxypropoxy)propyl (meth)acrylate, 3-(3-(3-methoxypropoxy)propoxy)propyl (meth)acrylate, 3-(3-(3-(3-methoxypropoxy)propoxy)propoxy)propyl (meth)acrylate, 3-(3-(3-(3-(3-methoxypropoxy)propoxy)propoxy)propoxy)propyl (meth)acrylate, 2-methoxy-1-propyl (meth)acrylate, 2-(2-methoxy-1-propoxy)-1-propyl (meth)acrylate, 2-(2-(2-methoxy-1-propoxy)-1-propoxy)-1-propyl (meth)acrylate, 2-(2-(2-(2-methoxy-1-propoxy)-1-propoxy)-1-propoxy)-1-propyl (meth)acrylate, 2-(2-(2-(2-(2-methoxy-1-propoxy)-1-propoxy)-1-propoxy)-1-propoxy)-1-propyl (meth)acrylate, 2-hydroxyethyl (meth)acrylate, 2-(2-hydroxyethoxy)ethyl (meth)acrylate, glyceryl (meth)acrylate, 2,3-oxopropyl (meth)acrylate, 3,4-oxocyclohexylmethyl (meth)acrylate, (meth)acryloxypropyltrimethoxysilane, (meth)acryloxypropylmethyldimethoxysilane, silicone-modified (meth)acrylic ester compound containing 2 to 60 dimethylsiloxane units, 3-substituted-1-propyl (meth)acrylate, and 3-(trimethylsiloxysilyl)-1-propyl (meth)acrylate.

In the formula (5) above, the (meth)acrylic acid amide includes (meth)acrylamide, N,N-dimethyl (meth)acrylamide, N,N-diethyl (meth)acrylamide, N-isopropyl (meth)acrylamide, morpholyl (meth)acrylate, N-methoxyethyl (meth)acrylamide, and N-(2-hydroxyethyl) (meth)acrylamide.

Although the (meth)acrylic acid derivative mentioned above is a monofunctional compound, it may optionally be incorporated with any polyfunctional (meth)acrylic acid compound for improvement in strength and adhesion. Such compounds include polyfunctional (meth)acrylic acid ester compounds such as ethylene glycol di(meth)acrylate, diethylene glycol di(meth)acrylate, triethylene glycol di(meth)acrylate, tetraethylene glycol di(meth)acrylate, glyceryl tris(meth)acrylate, pentaerythritol tetrakis(meth)acrylate, and trimethylolpropane tris(meth)acrylate, and bis(meth)acrylic acid amide compound derivatives such as N,N'-ethylene bis(meth)acrylamide and N,N'-propylene bis(meth)acrylamide. The foregoing additional compounds may also include any silicone-containing crosslinkable component, which typically includes X-22-164 series, X-22-2445, and X-22-1602, available from Shin-Etsu Chemical Co., Ltd.

Examples of the alkenyl compound include propene, hexene, heptene, octene, nonene, and decene. Examples of the cycloalkenyl group include cyclopentene, cyclohexene, cycloheptene, cyclooctene, and menthene. Examples of the alkynyl compound include acetylene, propyne, butyne, and pentyne. They may have the hydrogen atoms partly substituted with siloxanyl groups having 2 to 60 silicon atoms. Their examples include ethyne compound containing 2 to 60 dimethyl siloxane units 4-siloxanyl-1-butyne compound.

Examples of the styryl compound include styrene, α-methylstyrene, β-methylstyrene, and styrene derivatives which are formed from the foregoing styrene groups by substitution with a hydrocarbon group having 1 to 6 carbon atoms (having an optional oxygen or nitrogen atom) at the o-position, m-position, or p-position. Examples of the indenyl compound include indene, 1-methylindene, and 1,3-bis(3-indenyl)ethane.

The vinyl ether compound is one which is represented by $CH_2=CHOR^9$, wherein $R^9$ is, without specific restrictions, butyl group, heptyl group, octyl group, nonyl group, decyl group, 2-methoxyethyl group, 2-(2-methoxyethoxy)ethyl group, 2-(2-(2-methoxyethoxy)ethoxy)ethyl group, 2-(2-(2-(2-methoxyethoxy)ethoxy)ethoxy)ethyl group, and 2-(2-(2-(2-(2-methoxyethoxy)ethoxy)ethoxy) ethoxy)ethyl group.

Examples of the norbornyl compound includes norbornene and norbornene having a substituent group.

Examples of the conjugated or unconjugated alkadiene include butadiene, 1,3-pentadiene, 1,4-pentadiene, 1,3-hexadiene, 1,5-hexadiene, 1,3-octadiene, and 1,7-octadiene.

The component (B) is used as a diluent for the component (A). It is preferably a (meth)acrylic acid ester compound or (meth)acrylic acid amide compound because of its availability. One or at least two species of them may be used.

The content of component (B) per 100 parts by weight of component (A) is from 100 to 2,000 parts by weight, preferably 100 to 500 parts by weight With the content of component (B) less than 100 parts by weight, it leads to incomplete curing, resulting in a cured product low in storage elastic modulus. With the content of component (B) more than 2,000 pars by weight, it leads to a low viscosity, resulting in a cured product having an excessively high storage elastic modulus.

(C) Polymerization Initiator

The component (C) of the present invention is a polymerization initiator. It is a heat-decomposable radical initiator or a radiation-activatable reaction agent. The former may be an azo compound or an organic peroxide. It brings about radical polymerization upon heating, thereby giving rise to a cured product.

Examples of the azo compound (or organic azo compound) include azonitrile compounds (such as V-30, V-40, V-59, V-60, V-65, and V-70), azoamide compounds (such as VA-080, VA-085, VA-086, VF-096, VAm-110, and VAm-111), cyclic azoamidine compounds (such as VA-044 and VA-061), azoamidine compounds (such as V-50 and VA-057), which are commercially available from Wako Pure Chemical Industries, Ltd. Examples of the azo compound further include 2,2-azobis(4-methoxy-2,4-dimethylvaleronitrile), 2,2-azobis(2,4-dimethylvaleronitrile), 2,2-azobis(2-methylpropionitrile), 2,2-azobis(2,4-dimethylbutyronitrile), 1,1-azobis(cyclohexane-1-carbonitrile), 1-[(1-cyano-1-methylethyl)azo]formamide, 2,2-azobis{2-methyl-N-[1,1-bis(hydroxymethyl)-2-hydroxyethyl]propionamide}, 2,2-azobis[2-methyl-N-(2-hydroxybutyl)propionamide], 2,2-azobis[N-(2-propenyl)-2-methylpropionamide], 2,2-azobis(N-butyl-2-methylpropionamide), 2,2-azobis(N-cyclohexyl-2-methylpropionamide), 2,2-azobis[2-(2-imidazolin-2-yl)propane]dihydrochloride, 2,2-azobis[2-(2-imidazolin-2-yl)propane]disulfate dihydrate, 2,2-azobis{2-[1-(2-hydroxyethyl)-2-imidazolin-2-yl]propane}dihydrochloride, 2,2-azobis[2-(2-imidazolin-2-yl)propane], 2,2-azobis(1-imino-1-pyrolidino-2-methylpropane)dihydrochloride, 2,2-azobis(2-methylpropioneamidine)dihydrochloride, 2,2-azobis[N-(2-carboxyethyl)-2-methylpropioneamidine] tetrahydrate, dimethyl-2,2-azobis(2-methylpropionate), 4,4-azobis(4-cyanovaleric acid), and 2,2-azobis(2,4,4-trimethylpentane). Preferable among them are V-30, V-40, V-59, V-60, V-65, V-70, VA-080, VA-085, VA-086, VF-096, VAm-110, and VAm-111. Particularly preferable among them are V-30, V-40, V-59, V-60, V-65, and V-70.

Examples of the organic peroxide include ketone peroxide (such as perhexa H), peroxyketal (such as perhexa TMH), hydroperoxide (such as perbutyl H-69), dialkylperoxide (such as percumyl D, perbutyl C, and perbutyl D), diacylperoxide (such as naiper BW), peroxyester (such perbutyl Z and perbutyl L), peroxydicarbonate (such as perloyl TCP), which are commercially available from NOF Corporation. Examples of the organic peroxide further include diisobutylyl peroxide, cumylperoxy neodecanoate, di-n-propyl peroxy dicarbonate, diisopropyl peroxy dicarbonate, di-sec-butyl peroxy dicarbonate, 1,1,3,3-tetramethylbutyl peroxy neodecanoate, di(4-t-butylchlorohexyl)peroxy dicarbonate, di(2-ethylhexyl)peroxy dicarbonate, t-hexylperoxy neodecanoate, t-butylperoxy neodecanoate, t-butylperoxy neoheptanoate, t-hexylperoxy pivalate, t-butylperoxy pivalate, di(3,5,5-trimethylhexanoyl) peroxide, dilauroyl peroxide, 1,1,3,3-tetramethylbutyl peroxy-2-ethyl hexanoate, disuccinic acid peroxide, 2,5-dimethyl-2,5-di(2-ethylhexanoylperoxy)hexane, t-hexylperoxy-2-ethyl hexanoate, di(4-methylbenzoyl)peroxide, t-butylperoxy-2-ethyl hexanoate, di(3-methylbenzoyl)peroxide, benzoyl(3-methylbenzoyl)peroxide, dibenzoylperoxide, 1,1-di(t-butylperoxy)-2-methylcyclohexane, 1,1-di(t-hexylperoxy)-3,3,5-trimethylcylohexane, 1,1-di(t-hexylperoxy)cyclohexane, 1,1-di(t-butylperoxy)cyclohexane, 2,2-di[4,4-di-(t-butylperoxy)cyclohexyl]propane, t-hexylperoxyisopropyl monocarbonate, t-butylperoxymalic acid, t-butylperoxy-3,5,5-trimethyl hexanoate, t-butylperoxy laurate, t-butylperoxyisopropyl monocarbonate, t-butylperoxy-2-ethylhexyl monocarbonate, t-hexylperoxybenzoate, 2,5-dimethyl-2,5-di(benzoylperoxy)hexane, t-butylperoxyacetate, 2,2-di(t-butylperoxy)butane, t-butylperoxybenzoate, n-butyl-4,4-di-t-butylperoxyvalerate, di(2-t-butylperoxyisopropyl)benzene, dicumylperoxide, di-t-hexylperoxide, 2,5-dimethyl-2,5-di(t-butylperoxy)hexane, t-butylcumylperoxide, di-t-butylperoxide, p-methanehydroperoxide, 2,5-dimethyl-2,5-di(t-butylperoxy)hexan-3-yn, diisopropylbenzenehydroperoxide, 1,1,3,3-tetramethylbutylhydroperoxide, cumenehydroperoxide, t-butylhydroperoxide, 2,4-dichorobenzoylperoxide, o-chlorobenzoylperoxide, p-chlorobenzoylperoxide, tris(t-butylperoxy)triazine, 2,4,4-trimethylpentylperoxy neodecanoate, α-cumylperoxy neodecanoate, t-amylperoxy-2-ethyl hexanoate, t-butylperoxy isobutylate, di-t-butylperoxyhexahydro terephthalate, di-t-butylperoxytrimethyl adipate, di-3-methoxybutylperoxy dicarbonate, diisopropylperoxy dicarbonate, t-butylperoxyisopropyl carbonate, 1,6-bis(t-butylperoxycarbonyloxy)hexane, diethyleneglycol bis(t-butylperoxycarbonate), and t-hexylperoxy neodecanoate. Preferable among them are percumyl D, perbutyl C, and perbutyl D, particularly percumyl D.

The radiation-activatable reaction agent mentioned above is preferably one which is activated by such radiation as infrared rays, visible rays, ultraviolet rays, X-rays, electron rays, α-rays, β-rays, and γ-rays, particularly ultraviolet rays or visible rays.

The initiators to be activated by ultraviolet rays or visible rays which were mentioned above may be used alone or in combination of at least two. The one which may be used alone includes the following, for example. 1-hydroxycyclohexyl phenyl ketone, 2,2-dimethoxy-2-phenyl acetophenone, isobutylbenzoin ether, xanthone, fluorenone, benzaldehyde, fluorene, anthraquinone, triphenylamine, carbazole, 3-methylacetophenone, 4-chlorobenzophenone, 4,4'-dimethoxybenzophenone, 4,4-diaminobenzophenone, Michler's ketone, benzoin propyl ether, benzoin ethyl ether, benzyldimethylketal, 1-(4-isopropylphenyl)-2-hydroxy-2-methylpropan-1-on, 2-hydroxy-2-methyl-1-phenylpropan-1-on (Irgacure 1173), 2-hydroxy-1-[4-(2-hydroxyethoxy)phenyl]-2-methyl-1-propanone, 2-benzyl-2-dimethylamino-1-(4-morpholinophenyl)-butan-1-on (Irgacure 369), 2-dimethylamino-2-(4-methylbenzyl)-1-(4-morpholin-4-yl-phenyl) butan-1-on, diethoxyacetophenone, thioxanthone, diethylthioxanthone, 2-isopropylthioxanthone, 2-chlorothioxanthone, 2-methyl-1-[4-(methylthio)phenyl]-2-morpholino-propane-1-on, 2,4,6-trimethylbenzoyldiphenylphosphineoxide (Irgacure TPO), bis(2,4,6-trimethylbenzoyl)phenylphosphineoxide (Irgacure 819), and bis(2,6-dimethoxybenzoyl)-2,4,4-trimethylpentylphosphineoxide.

If two or more initiators are to be used in combination of at least two, they should be mixed such that their absorption spectra for ultraviolet rays and visible rays complement each other. They may also be mixed with the retardation by oxygen taken into consideration. This object may be achieved by adding a mixture of phosphine oxide and benzophenone as much as necessary. Examples of the phosphine oxide include bis(2,4,6-trimethylbenzoyl)phenylphosphineoxide and examples of the benzophenone include 2-hydroxy-2-methyl-1-phenylpropan-1-on. The benzophenone may be mixed with 2,2-dimethoxy-1,2-diphenylethan-1-on, 1-hydroxycyclohexylphenylketene, or 1-hydroxycyclohexylphenylketene.

The content of component (C) per 100 parts by weight of the total content of the components (A) and (B) is 0.1 to 30 parts by weight, preferably 1 to 10 parts by weight. With the content of component (C) less than 0.1 parts by weight, it does not bring about sufficient curing. With the content of component (C) more than 30 parts by weight, it gives off a large amount of gas derived from the initiator, resulting in cure shrinkage.

(D) Hydrophobic Fumed Silica

The component (D) is hydrophobic fumed silica which is essential to protect the composition from drooling and bubble entrapment at the time of application, ensure the composition's uniformity, allow the composition to exhibit thixotropic properties while maintaining good formability, and prevent excessive curing thereby producing cured products with a low elastic modulus. The hydrophobic fumed silica should be dry silica. In order for the fumed silica to achieve the forgoing object, it should preferably have a bulk density lower than 1 g/mL. The one having a bulk density at least 1 g/mL will precipitate when the composition is prepared. Moreover, the fumed silica should preferably have a mean primary particle diameter ranging from 1 to 100 nm. This condition is necessary for the silicone-modified polyimide-containing composition of solvent free type to give rise to a cured product which has good clarity owing to the absence of light scattering by the fumed silica. The mean primary particle diameter may be determined in terms of weight mean diameter (or median diameter) by means of a particle size distribution meter which relies on analyzing means such as the laser diffraction method. An example of the device for such measurement is Digital Microscope VHX-5000 available from Keyence Corporation. Moreover, the fumed silica should preferably have a BET specific surface area of from 100 to 300 $m^2/g$.

The fumed silica as the component (D) is silica fine powder which finds use as a thickener (or thixotropic thickener) to be added to adhesives for structural use, industrial use, and household use for improvement in workability. The fumed silica should be especially dry silica produced from silicon halide by hydrolysis in oxygen-hydrogen flames. Such silica fine powder is disclosed in JP-A 1992-25588, 1992-28755, and 1992-33916, and Degussa's catalog about "Aerosil for solvent free epoxy adhesive" ("AEROSIL fur loesemittelfreie Epoxyidharze," Degussa AG Schriftenreihe Pigmente No. 27).

Examples of the commercial fumed silica are listed below.
AEROSIL R8200 from Nippon Aerosil Co., Ltd., hydrophobic dry silica surface-treated with hexamethyldisilazane (having a specific surface area of 160 $m^2/g$, adsorbed carbon of 3.0% by weight, and bulk density of 0.14 g/mL)

RX200 from Nippon Aerosil Co., Ltd., hydrophobic dry silica surface-treated with hexamethyldisilazane (having a specific surface area of 140 m²/g, adsorbed carbon of 2.3% by weight, and bulk density of 0.05 g/mL)

Rheoloseal DM-10 from Tokuyama Corporation, hydrophobic dry fumed silica with surface treatment (having a specific surface area of 190 m²/g, bulk density of 0.05 g/mL, and mean primary particle diameter of 15 nm)

Rheoloseal DM-30 from Tokuyama Corporation, hydrophobic dry fumed silica with surface treatment (having a specific surface area of 230 m²/g, bulk density of 0.05 g/mL, and mean primary particle diameter of 7 nm)

Rheoloseal DM-30S from Tokuyama Corporation, hydrophobic dry fumed silica with surface treatment (having a specific surface area of 230 m²/g, bulk density of 0.05 g/mL, and mean primary particle diameter of 7 nm)

Rheoloseal HM-20S from Tokuyama Corporation (having a mean primary particle diameter of 12 nm)

Rheoloseal HM-30S from Tokuyama Corporation (having a mean primary particle diameter of 7 nm)

Rheoloseal HM-40S from Tokuyama Corporation (having a mean primary particle diameter of 7 nm)

Rheoloseal ZD-30S from Tokuyama Corporation (having a mean primary particle diameter of 7 nm)

The content of component (D) per 100 parts by weight of the total content of the components (A) and (1) is 1 to 50 parts by weight, preferably 3 to 30 parts by weight, more preferably 5 to 20 parts by weight. With the content of component (D) less than 1 part by weight, it does not work satisfactorily as a thickener to impart thixotropic properties, and the resulting composition is excessively low in viscosity. With the content of component (D) more than 50 parts by weight, it results in a composition having very little fluidity and poor workability.

(E) Adhesion Auxiliary Agent

Examples of an adhesion auxiliary agent as the component (E) include those compounds represented by the formula (4) below. They may be used alone or in combination of at least two.

(4)

(In the formula (4), I is a monovalent unsaturated hydrocarbon group having a polymerizable group at each end and having 6 to 20 carbon atoms, J is a divalent siloxane unit represented by the formula (5), K is a divalent hydrocarbon group having 6 to 20 carbon atoms, and jk is a integer from 1 to 10.)

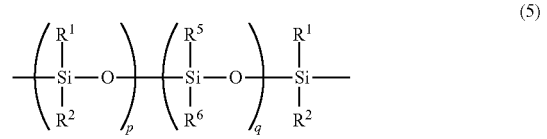
(5)

(In the formula (5), $R^1$, $R^2$, $R^5$, and $R^6$ are defined as above; and p is an integer from 1 to 60 and q is an integer from 0 to 60, with p+q≥1 and p+q=1 to 60.)

In the formula (4) above, I is a monovalent unsaturated hydrocarbon group having a polymerizable group at each end and having 6 to 20 carbon atoms. Examples of I include hexa-5-en-1-yl group, hepta-6-en-1-yl group, octa-7-en-1-yl group, nona-8-en-1-yl group, desa-9-en-1-yl group, undeca-10-en-1-yl group, dodeca-11-en-1-yl group, trideca-12-en-1-yl group, tetradeca-13-en-1-yl group, pentadeca-14-en-1-yl group, hexadeca-15-en-1-yl group, heptadeca-16-en-1-yl group, octadeca-17-en-1-yl group, nonadeca-18-en-1-yl group, eicosa-19-en-1-yl group, 2-(4-vinylphenyl)ethane-1-yl group, 2-(cyclohexa-3-en-1-yl)ethane-1-yl group, and 2-([2,2,1]-hepta-3-en-1-yl)ethane-1-yl group.

K is a divalent hydrocarbon group having 6 to 20 carbon atoms, and jk is an integer from 1 to 10.

p is an integer from 1 to 60, preferably 1 to 40, and q is an integer from 0 to 60, preferably 0 to 30, with p+q being 1 to 60, preferably 1 to 40.

The formula (5) typically represents the following compounds, in which Ph is a phenyl group and p and q are defined as above, with q=q'+q''.

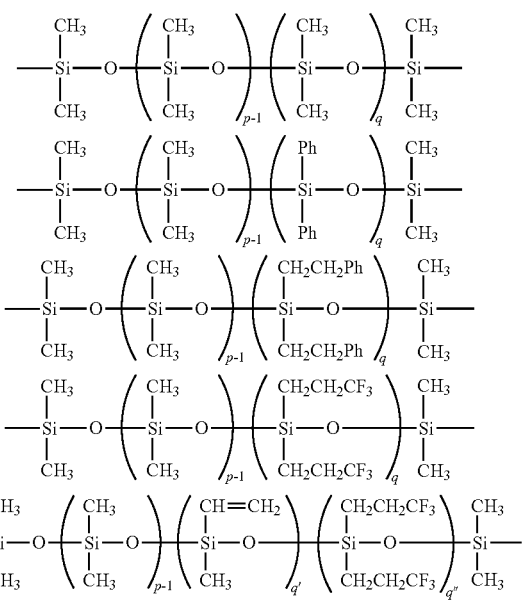

The content of component (E) per 100 parts by weight of the total content of the components (A) and (B) is 0.1 to 5 parts by weight, preferably 1.0 to 3.0 parts by weight. With an excessively small content, it hardly contributes to adhesion; and with an excessively large content, it causes the component (E) to separate out, resulting in poor adhesion.

The polysilalkylenesiloxane represented by the formula (4), which is the component (E) as an adhesion auxiliary agent, is produced by reaction between an unsaturated hydrocarbon compound having polymerizable groups at its both ends and having 6 to 20 carbon atoms and an organohydrogenpolysiloxane (represented by the formula (8)) in the presence of a catalyst of organometal complex.

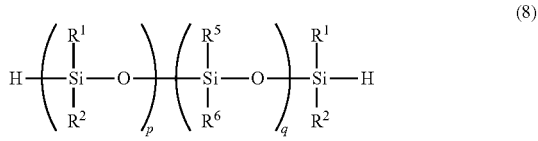
(8)

(In the formula (8) above, $R^1$, $R^2$, $R^5$, and $R^6$, and p and q are defined as above.)

Production of the compound represented by the formula (4) is accomplished by repeating several times reaction between the unsaturated hydrocarbon compound and the organohydrogenpolysiloxane. The reaction is controlled such that the ends of the formula (4) are blocked with polymerizable groups. There are two methods for reaction as mentioned below depending on the molar ratio of raw materials employed.

The first method for production of the compound represented by the formula (4) includes reacting the unsaturated hydrocarbon compound in an excess amount with the organohydrogenpolysiloxane, while distilling out the excess unsaturated hydrocarbon compound. This reaction gives rise to polysilalkylenesiloxane having unsaturated hydrocarbon groups at each end thereof. The molar ratio between the unsaturated hydrocarbon and the organohydrogenpolysiloxane is preferably lager than 1.0, more preferably from 2.0 to 5.0. Molar ratios higher than 5.0 pose no problems in reaction but lead to a waste of raw materials which is uneconomical.

The second method is designed to synthesize in multiple stages the compound represented by the formula (4). The first stage starts with reaction between the organohydrogenpolysiloxane in excess amount and the unsaturated hydrocarbon compound, with the excess organohydrogenpolysiloxane distilled out. The reaction in this manner gives rise to a silalkylenesiloxane having hydrosilyl groups at each ends thereof. The second stage includes distilling out the unsaturated hydrocarbon compound from the silalkylenesiloxane having hydrosilyl groups at each ends thereof. In this way there is obtained the polysilalkylenesiloxane. The resulting product is a structurally controlled polysilalkyenesiloxane of long molecular chain having unsaturated hydrocarbon groups at both ends thereof. The first stage should be carried out such that the molar ratio between the unsaturated hydrocarbon and the organohydrogenpolysiloxane is lower than 1.0, preferably from 0.5 to 0.2. Molar ratios lower than 0.2 pose no problems in reaction but lead to a waste of raw materials which is uneconomical.

It is desirable that the unsaturated hydrocarbon compound and organohydrogenpolysiloxane should be used in such amounts that their theoretical molar ratio is 1.0. However, the reaction in this manner undesirably causes the unsaturated hydrocarbon compound to undergo internal transformation for the carbon-carbon double bond at each end by the transition metal complex catalyst, which makes the reactant inactive.

Examples of the unsaturated hydrocarbon compound having polymerizable groups at both ends and having 6 to 20 carbon atoms include 1,5-hexadiene, 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, 1,14-pentadecadiene, 1,15-hexadecadiene, 1,16-heptadecadiene, 1,17-octadecadiene, 1,18-nonadiene, 1,19-eicosadiene, 1,4-divinylbenzene, 4-vinyl-1-cyclohexane, and 3-vinyl-2-[2,2,1]-heptene. Preferable among them are 1,5-hexadiene, 1,6-heptadiene, 1,7-octadiene, 1,8-nonadiene, 1,9-decadiene, and 1,4-divinylbenzene.

In the formula (8), p is preferably 1 to 60, more preferably 1 to 40, and q is preferably 0 to 60, more preferably 0 to 30, with p+q being 1 to 60, particularly 1 to 40.

The formula (8) typically represents those compounds listed below, in which Ph is a phenyl group and p and q are defined as above, with q-q'+q".

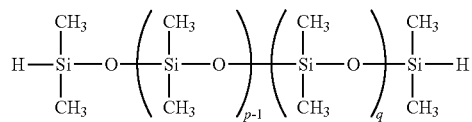

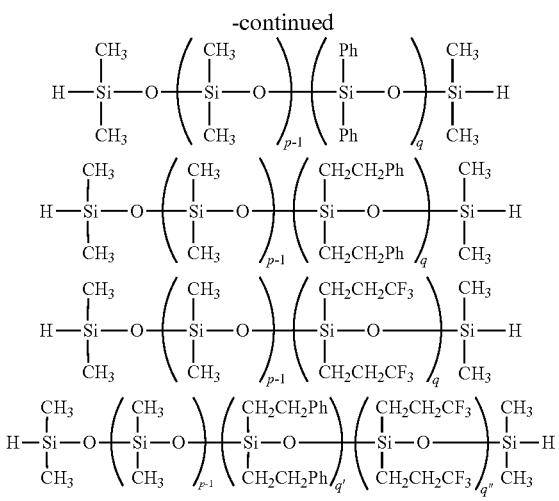

The organometal complex catalyst is preferably a transition metal complex catalyst, such as platinum complex catalyst, palladium complex catalyst, rhodium complex catalyst, ruthenium complex catalyst, and iridium complex catalyst. More preferable examples include platinum catalysts, or chloroplatinic acid hexahydrate, selected from the following.

Speier catalyst
Karstedt catalyst: $Pt_2[[(CH_2=CH_3)(CH_3)_2Si]_2O]$
Ashby catalyst: $Pt_4[CH_2=CHSi(CH_3)O]_4$
Lamoreaux catalyst: platinum-octanol/octanol complex
The first one or the second one is preferable.

These catalysts should be used in an amount of 0.1 to 500 ppm, preferably 0.1 to 100 ppm, for the total amount (by weight) of the substrates.

The adhesion auxiliary agent represented by the formula (4) above may be produced in the presence or absence of solvent. In the former case, the solvent is preferably selected from substituted or unsubstituted aromatic hydrocarbon compounds having 6 to 12 carbon atoms and having hydrocarbon groups having 1 to 6 carbon atoms; substituted or unsubstituted saturated alicyclic hydrocarbon compounds having 5 to 12 carbon atoms having linear, branched, or cyclic hydrocarbon groups having 1 to 6 carbon atoms; linear, branched, or cyclic amide compounds optionally having a linear, branched, or cyclic hydrocarbon having 1 to 8 carbon atoms on nitrogen; linear, branched, or cyclic saturated or unsaturated hydrocarbon compounds having 1 to 8 carbon atoms substituted independently with oxygen atoms; linear, branched, or cyclic ether compounds substituted with one to three oxygen atoms; linear, branched, or cyclic ketone compounds having 1 to 7 carbon atoms optionally substituted with oxygen atoms; linear, branched, or cyclic alkylnitrile having 1 to 6 carbon atoms; linear, branched, or cyclic saturated or unsaturated halogenated hydrocarbon compounds having 1 to 10 carbon atoms; and linear or branched alcohol compounds having 1 to 6 carbon atoms.

Examples of the solvents include toluene, o-xylene, m-xylene, p-xylene, 1,3,5-mesitylene, 1,2,3-mesitylene, 1,2,4-mesitylene, ethylbenzene, n-propylbenzene, i-propylbenzene, n-butylbenzene, i-butylbenzene, sec-butylbenzene, t-butylbenzene, n-pentylbenzene, i-pentylbenzene, sec-pentylbenzene, t-pentylbenzene, n-hexylbenzene, i-hexylbenzene, sec-hexylbenzene, t-hexylbenzene, cyclopentane, cyclohexane, cycloheptane, cyclooctane, methylcyclohexane, ethylcyclohexane, propylcyclohexane, n-butylcyclohexane, i-butylcyclohexane, sec-butylcyclohexane, t-butylcyclohexane, n-pentylcyclohexane, i-pentylcyclohexane, sec-pentylcyclohexane, t-pentylcyclohexane, n-hexylcyclohexane, i-hexylcyclohexane, sec-hexylcyclohexane, t-hexylcyclohexane, limonene, N,N'-dimethylformamide (DMF), N,N'-dimethylformacetamide (DMAc), 1,3-dimethyl-2-imidazolidinone (DMI), 1,3-dimethyl-3,4,5,6-tetrahydro-2 (1H)-pyrimidinone (DMPU), diethyl ether, t-butyl methyl ether (TBME), dibutyl ether, cyclopentyl methyl ether (CPME), diphenyl ether, dimethoxymethane (DMM), 1,2-dimethoxyethane, diethyleneglycol dimethyl ether, tetrahydrofuran (THF), tetrahydropyran (THP), dioxane, 2-methyltetrahydrofuran, 2-ethyltetrahydrofuran, acetone, methyl ethyl ketone (MEK), methyl isobutyl ketone (MIBK), cyclopentanone, cyclohexanone, cycloheptanone, acetonitrile, propionitrile, butylonitrile, α,α,α-trifluoromethylbenzene, chlorobenzene, chloroform, dichloromethane, 1,2-dichloroethane, methanol, ethanol, 1-propanol, 2-propanol (IPA), n-butyl alcohol, i-butyl alcohol, sec-butyl alcohol, t-butyl-alcohol, 1,2-ethylene glycol, 1,3-propylene glycol, 1,2-dihydroxypropane, 2-methoxyethanol, and 2-(2-methoxyethoxy)ethanol. Preferable among them are toluene, ethylbenzene, methylcyclohexane, ethylcyclohexane, ethanol, and IPA. The solvent may be omitted.

The silicone-modified polyimide-containing composition of solvent free type of the present invention is produced by the process which includes a first step of dissolving the silicone-modified polyimide resin (A) in the polymerizable compound (B), thereby giving a solution of silicone-modified polyimide and polymerizable compound, and a second step of incorporating the thus obtained solution of silicone-modified polyimide and polymerizable compound with the polymerization initiator (C), the fumed silica (D) and the adhesion auxiliary agent (E) while stirring.

The silicone-modified polyimide-containing composition of solvent free type of the present invention may vary in viscosity depending on its usage. It should be fluid at 25° C. and have a viscosity (at 25° C.) of from 3 to 1,000 Pa·s, preferably 8 to 150 Pa·s, from the standpoint of handleability. With a viscosity lower than 3 Pa·s, it will offer difficulty in coating a specified area owing to spreading. With a viscosity higher than 1,000 Pa·s, it will be poor in fluidity at 25° C. and liable to bubbling and uneven coating. The poor fluidity leads to poor extrudability from a syringe or the like.

In addition, the composition of the present invention may be incorporated with the component (F) which is a modifying additive. The modifying additive is siloxane-modified (meth)acrylate or a compound containing epoxy groups. They include X-22-174 series (X-22-174ASX and X-22-174DX) and X-22-2404, which are available from Shin-Etsu Chemical Co., Ltd.

The content of component (F) per 100 parts by weight of the total content of the components (A) and (B) is preferably 0 to 20 parts by weight. A preferable amount is at least 5 parts by weight, in case of incorporating component (F). The siloxane-modified (meth)acrylate exceeding 10 parts by weight will produce an adverse effect on adhesion. The epoxy-group containing compound exceeding 20 parts by weight will make the resulting composition to excessively increase in storage elastic modulus, which leads to a hard coating film.

Moreover, the composition of the present invention may be optionally incorporated with the component (G) which is a siloxane-based leveling agent. An example of the leveling agent is a siloxane-based one, especially (meth)acrylic acid-modified silicone as represented by the formula (9). The leveling agent makes the coating surface to improve in smoothness and decrease in dynamic coefficient of friction.

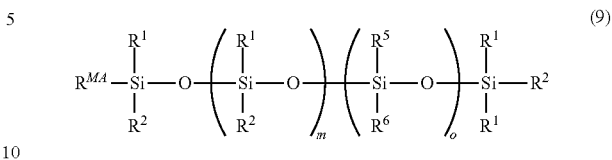

(In the formula (9), $R^{MA}$ is a monovalent hydrocarbon group having a (meth)acryl group, and $R^1$, $R^2$, $R^5$, $R^6$, and m and o are defined as above, with the sum of m and o being an integer from 3 to 40. The repeating units are randomly bonded.) A preferable compound is represented by the formula (10):

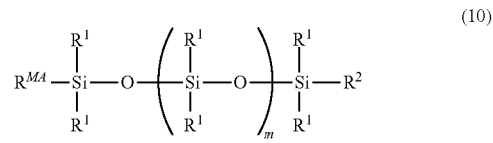

(in the formula (10), $R^{MA}$, $R^1$, $R^2$, and m are defined as above.)

Preferred examples are X-22-174 series (X-22-174ASX, X-22-174DX) and X-22-2404, available from Shin-Etsu Chemical Co., Ltd.

The content of component (G) per 100 parts by weight of the total content of the components (A) and (B) is preferably 1 to 20 parts by weight, more preferably 5 to 10 parts by weight. With the content of component (G) less than 1 part by weight, it does not produce its effect; and with the content of component (G) more than 20 parts by weight, it undergoes phase separation from the siloxane component.

The composition of the present invention may also be incorporated with the component (H) which is a dye, so that the surface coating with the composition has good visibility. Stirring and mixing the foregoing composition with a dye yield a silicone modified polyimide resin composition of solvent free type which is colored.

The dye may be a color pigment, such as azo pigment, phthalocyanine pigment, dioxazine pigment, quinacridone pigment, anthraquinone pigment, perynone pigment, perylene pigment, thioindigo pigment, isoindolinone pigment, quinophthalone pigment, azomethineazo pigment, diketopyrrolopyrrole pigment, and isoindoline pigment. These coloring agents may be used alone or in combination of at least two.

The content of component (H) based on the total content of the composition containing the silicone-modified polyimide resin is preferably 0.1% to 10% by weight, in order to express a sufficient concentration and tint strength. An excess amount will cause such trouble as leaching.

Problems with leaching may be properly avoided by using a polymerizable dye known as RDW series available from Wako Pure Chemical Industries, Ltd. It may be prepared by adding a polymerizable dye to the silicone-modified polyimide resin composition of solvent free type followed by stirring and mixing. Examples of the polymerizable dye include RDW-R13 (purple), RDW-R60 (red), RDW-Y03 (yellow), RDW-G01 (green), and RDW-B01 (blue). The content of the polymerizable dye based on the silicone-modified polyimide-containing composition may be 0.001% to 0.1% by weight.

The silicone-modified polyimide-containing composition of solvent free type of the present invention is colorless as determined by a color difference meter in terms of the L*a*b* colorimetric system such that the L* value is larger than 0, the a* value is from −10 to 10, and the b* value is from −10 to 10.

The composition of the present invention is preferably cured by irradiation with ultraviolet rays having a wavelength of from 200 to 750 nm, particularly from 220 to 380 nm, or by irradiation with visible rays having a wavelength of from 380 to 500 nm. The dosage is preferably 1 to 5,000 mJ/m², especially 250 to 2,000 mJ/m².

The composition of the present invention will give rise to a cured coating film upon curing by irradiation with ultraviolet rays and/or visible rays, the coating film has a storage elastic modulus of from 1 to 500 MPa, a light transmittance in the visible region at least 80%, and a color in terms of the L*a*b* colorimetric system such that L* is at least 80%, a* is from −10% to 10%, and b* is from −10% to 10%.

The silicone-modified polyimide resin composition of solvent free type of the present invention will find use as an adhesive or a coating material that can be cued by irradiation with ultraviolet rays and/or visible rays. The adhesive and coating material can be applied to various kinds of substrates, which include metals such as iron, copper, nickel, and aluminum, inorganic materials such as glass, and organic resins such as epoxy resin, acrylic resin, polycarbonate resin, polyethylene terephthalate (PET) resin, and liquid crystal polymer (LCP) resin.

The adhesive and coating material obtained from the silicone-modified polyimide resin composition of solvent free type of the present invention can be used for electronic materials, optical materials, and on-vehicle equipment.

EXAMPLES

The present invention will be described below with reference to Examples for synthesis and application, which are not intended to restrict the scope thereof but may be properly modified within the technical scope thereof. Incidentally, the term "parts" used hereafter means "parts by weight."

Measurements in the Examples were carried out as follows.
Molecular weight:
measured with GPC (made by Tosoh Corporation), in which the mobile phase is tetrahydrofuran (THF), and expressed in terms of polystyrene.
Infrared (IR) absorption spectrum:
measured with NICOLET 6700 (made by Thermo Fisher Scientific Inc.)
L*a*b* colorimetric system:
measured with a spectrocolorimetic meter (CM-5 made by Konica Minolta, Inc.)
Viscoelasticity of cured film:
measured with DMS 6100 (made by Hitachi High-Tech Science Corporation (former Seiko Instruments Inc.))
[Method for Cross-Cut Adhesion Test]
A sample of the composition containing silicone-modified polyimide resin is applied onto a glass plate to form a 1-mm thick coating film thereon. The coating film is cured by irradiation with ultraviolet rays from a metal halide lamp (with cumulative luminous energy being 2,000 mJ/m²). The cured coating film is exposed for 24 hours under a condition of high temperature and high humidity at 80° C. and 95% RH. The sample before and after the exposure undergoes cross-cut test (JIS K5400) for adhesion to the glass plate.

Synthesis Example 1

A reactor equipped with a stirrer, thermometer, and nitrogen inlet tube was charged with 30.0 g (0.1 mol) of 5-(2,4-dioxacyclopentyl)-3a,4,5,9b-tetrahydronaphtho[1,2-c]furan-1,3-dione, 250 g of N,N-dimethylacetamide, and 100 g of toluene. Subsequently, the reactor was charged further with 10.3 g (0.025 mol) of 2,2-bis[4-(4-aminophenoxy)phenyl]propane. Reaction was carried out at 50° C. for 3 hours. The reaction product kept at room temperature was given dropwise 66.6 g (0.075 mol) of siloxane represented by the formula (i) below. This step was followed by stirring at room temperature for 12 hours.

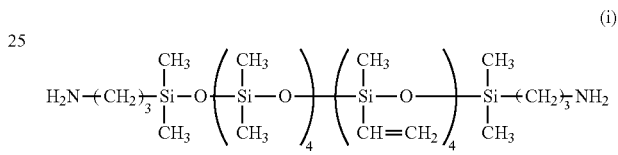

(i)

Then, the reactor mentioned above was charged with 20.4 g of acetic anhydride and 26.4 g of pyridine, followed by stirring at 50° C. for 3 hours.

The resulting reaction solution underwent reprecipitation from methanol. Thus, there was obtained a silicone-modified polyimide resin containing 26% by weight of siloxane. This product gave an infrared absorption spectrum which does not show absorption attributable to polyamic acid as an unreacted functional group but shows absorption at 1,780 cm⁻¹ and 1,720 cm⁻¹ attributable to imide groups.

The resulting resin was found by GPC to have a weight-average molecular weight of 35,000. The resulting resin was also applied onto a quartz glass substrate to form a 100-μm thick film thereon. The coating film was found to have a light transmittance at least 80% at wavelength of 350 to 450 nm. The coating film gave a transmittance spectrum shown in FIG. 1.

Synthesis Example 2

A reactor equipped with a stirrer, thermometer, and nitrogen inlet tube was charged with 30.6 g (0.1 mol) of dicyclohexyl-3,4,3',4'-tetracarboxylic acid dianhydride, 250 g of N,N-dimethylacetamide, and 100 g of toluene. Subsequently, the reactor was charged further with 10.3 g (0.025 mol) of 2,2-bis[4-(4-aminophenoxy)phenyl]propane. Reaction was carried out at 50° C. for 3 hours. The reaction product kept at room temperature was given dropwise 66.6 g (0.075 mol) of siloxane represented by the formula (i) above. This step was followed by stirring at room temperature for 12 hours.

Then, the reactor mentioned above was charged with 20.4 g of acetic anhydride and 26.4 g of pyridine, followed by stirring at 50° C. for 3 hours.

The resulting reaction solution underwent reprecipitation from methanol. Thus, there was obtained a silicone-modified polyimide resin containing 62% by weight of siloxane. This product gave an infrared absorption spectrum which does not show absorption attributable to polyamic acid as an unreacted functional group but shows absorption at 1,780 cm$^{-1}$ and 1,720 cm$^{-1}$ attributable to imide groups.

The resulting resin was found by GPC to have a weight-average molecular weight of 33,000. The resulting resin was also applied onto a quartz glass substrate to form a 100-μm thick film thereon. The coating film was found to have a light transmittance at least 80% at wavelength of 350 to 450 nm.

Synthesis Example 3

A reactor equipped with a stirrer, thermometer, and nitrogen inlet tube was charged with 22.4 g (0.1 mol) of cyclohexane-1,2,4,5,-tetracarboxylic acid dianhydride, 250 g of N,N-dimethylacetamide, and 100 g of toluene. Subsequently, the reactor was charged further with 10.3 g (0.025 mol) of 2,2-bis[4-(4-aminophenoxy)phenyl]propane. Reaction was carried out at 50° C. for 3 hours. The reaction product kept at room temperature was given dropwise 66.6 g (0.075 mol) of siloxane represented by the formula (i) above. This step was followed by stirring at room temperature for 12 hours.

Then, the reactor mentioned above was charged with 20.4 g of acetic anhydride and 26.4 g of pyridine, followed by stirring at 50° C. for 3 hours.

The resulting reaction solution underwent reprecipitation from methanol. Thus, there was obtained a silicone-modified polyimide resin containing 67% by weight of siloxane. This product gave an infrared absorption spectrum which does not show absorption attributable to polyamic acid as an unreacted functional group but shows absorption at 1,780 cm$^{-1}$ and 1,720 cm$^{-1}$ attributable to imide groups.

The resulting resin was found by GPC to have a weight-average molecular weight of 31,000. The resulting resin was also applied onto a quartz glass substrate to form a 100-μm thick film thereon. The coating film was found to have a light transmittance at least 80% at wavelength of 350 to 450 nm.

Synthesis Example 4

A reactor equipped with a stirrer, thermometer, and nitrogen inlet tube was charged with 30.0 g (0.1 mol) of 5-(2,4-dioxacyclopentyl)-3a,4,5,9b-tetrahydronaphtho[1,2-c]furan-1,3-dione, 250 g of N,N-dimethylacetamide, and 100 g of toluene. Subsequently, the reactor was charged further with 12.6 g (0.025 mol) of 2,2'-[2-hydroxy-3-(3,5-dimethyl-4-amino)-benzyl-5-methyl]diphenylmethane. Reaction was carried out at 50° C. for 3 hours. The reaction product kept at room temperature was given dropwise 68.6 g (0.075 mol) of siloxane represented by the formula (ii) below. This step was followed by stirring at room temperature for 12 hours.

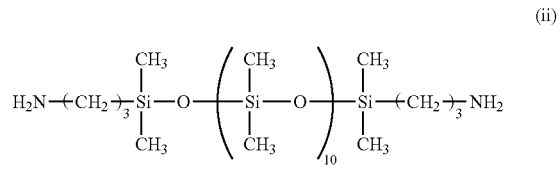

(ii)

Then, the reactor mentioned above was charged with 20.4 g of acetic anhydride and 26.4 g of pyridine, followed by stirring at 50° C. for 3 hours.

The resulting reaction solution underwent reprecipitation from methanol. Thus, there was obtained a silicone-modified polyimide resin containing 68% by weight of siloxane. This product gave an infrared absorption spectrum which does not show absorption attributable to polyamic acid as an unreacted functional group but shows absorption at 1,780 cm$^{-1}$ and 1,720 cm$^1$ attributable to imide groups.

The resulting resin was found by GPC to have a weight-average molecular weight of 22,000. The resulting resin was also applied onto a quartz glass substrate to form a 100-μm thick film thereon. The coating film was found to have a light transmittance at least 80% at wavelength of 350 to 450 nm.

Synthesis Example 5

A reactor equipped with a stirrer, thermometer, and nitrogen inlet tube was charged with 30.0 g (0.1 mol) of 5-(2,4-dioxacyclopentyl)-3a,4,5,9b-tetrahydronaphtho[1,2-c]furan-1,3-dione, 250 g of N,N-dimethylacetamide, and 100 g of toluene. Subsequently, the reactor was charged further with 10.3 g (0.025 mol) of 2,2-bis[4-(4-aminophenoxy)-phenyl]propane. Reaction was carried out at 50° C. for 3 hours. The reaction product kept at room temperature was given dropwise 105.0 g (0.075 mol) of siloxane represented by the formula (iii) below. This step was followed by stirring at room temperature for 12 hours.

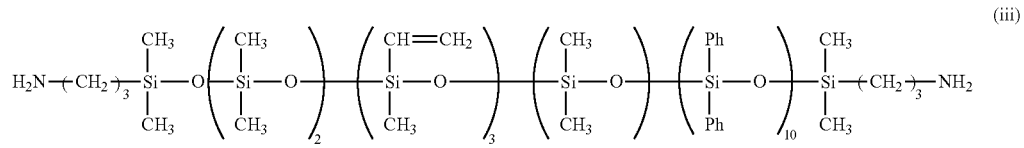

(iii)

Then, the reactor mentioned above was charged with 20.4 g of acetic anhydride and 26.4 g of pyridine, followed by stirring at 50° C. for 3 hours.

The resulting reaction solution underwent reprecipitation from methanol. Thus, there was obtained a silicone-modified polyimide resin containing 75% by weight of siloxane. This product gave an infrared absorption spectrum which does not show absorption attributable to polyamic acid as an unreacted functional group but shows absorption at 1,780 cm$^{-1}$ and 1,720 cm$^{-1}$ attributable to imide groups.

The resulting resin was found by GPC to have a weight-average molecular weight of 31,500. The resulting resin was also applied onto a quartz glass substrate to form a 100-μm thick film thereon. The coating film was found to have a light transmittance as shown in FIG. 2.

Synthesis Example 6

A reactor was charged with 295.5 g (2.2 mol) of 1,1,4,4-tetramethyldisiloxane and 100 g of toluene. The content was heated at 50° C. with stirring, in the presence of Karstedt catalyst ($Pt_2[[(CH_2=CH)(CH_3)_2Si]_2O]_3$) in an amount of 5 ppm for the total amount of the reactants. Subsequently, the reactor was further charged dropwise with 110.2 g (1.0 mol) of 1,7-octadiene (made by Tokyo Chemical Industry Co., Ltd., product code: 00104) at 55° C. to 60° C. Reaction was carried out with stirring at 55° C. to 60° C. for 4 hours. After cooling to room temperature, the reaction product had low-boiling compounds distilled away under reduced pressure at 120° C. for 2 hours. Thus there was obtained a clear liquid product assuming a light yellowish color.

The resulting liquid product was identified by infrared absorption spectrum to be a compound having SiH groups at both ends, as represented by the formula (iv) below, with p being an integer at least 1 according to GPC analysis and the average value thereof being 2.0.

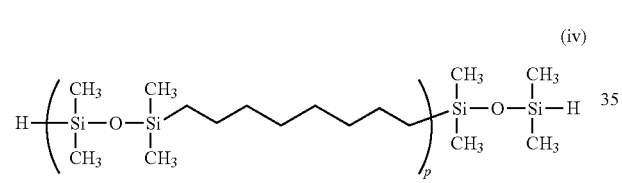

(iv)

Synthesis Example 7

A reactor was charged with 148.0 g (135 mol) of 1,7-octadiene and 100 g of toluene. The content was heated at 50° C. with stirring, in the presence of Karstedt catalyst in an amount of 5 ppm for the total amount of the reactants. Subsequently, the reactor was further charged dropwise with 242.5 g (0.90 mol in terms of hydrosilyl group) of the compound represented by the formula (iv) in Synthesis Example 6 at 55° C. to 60° C. Reaction was carried out with stirring at 65° C. for 2 hours. After cooling to room temperature, the reaction product had low-boiling compounds distilled away under reduced pressure at 120° C. for 2 hours. Thus there was obtained a clear liquid product assuming a light yellowish color.

The resulting liquid product was identified by infrared absorption spectrum (shown in FIG. 3) to be a compound represented by the formula (v) below, which has carbon-carbon double bonds at both ends without internal transformation. In the formula (v), p' is an integer at least p, with the average value thereof being 3.6.

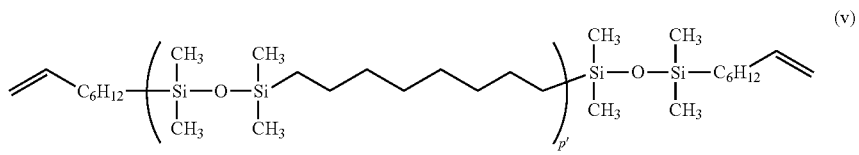

(v)

Synthesis Example 8

The same procedure as Synthesis Example 6 was repeated except that the 1,7-octadiene was replaced by the compound represented by the formula (v) and synthesized in Synthesis Example 7. Thus there was obtained a clear liquid compound assuming a light yellowish color.

The resulting liquid product was identified by infrared absorption spectrum to be a compound represented by the formula (vi) below, which has the structure of SiH at both ends. In the formula (vi), p" is an integer at least p', with the average value thereof being 8.7.

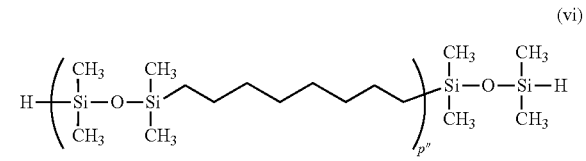

(vi)

Synthesis Example 9

The same procedure as Synthesis Example 7 was repeated except that the compound represented by the formula (v) was replaced by the compound represented by the formula (vi) in Synthesis Example 8. Thus there was obtained a clear liquid compound assuming a light yellowish color.

The resulting liquid compound was identified by infrared absorption spectrum to be a compound represented by the formula (vii) below, which has carbon-carbon double bonds at both ends without internal transformation. In the formula (vii), p'" is an integer at least p", with the average value thereof being 13.

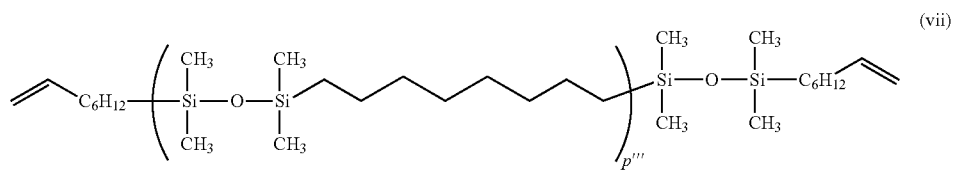

(vii)

200 parts of isobornyl acrylate (IDXA) was added to 100 pails of the silicone-modified polyimide resin obtained in Synthesis Example 1, and stirred to obtain a dissolved product. 6 parts of Reolosil DM-30S, 3 parts of Irgacure 1173, and 1 part of the compound of the formula (v) of Synthesis Example 7 were added to 100 parts of this dissolved product with mixing and stirring to obtain composition comprising silicone-modified polyimide resin. The thus obtained composition has a viscosity of 10 Pa s at 25° C. This composition was applied onto a Teflon (registered trademark) plate so as to form a 1-mm thick coating film thereon. The coating film was cured by irradiation with ultraviolet rays from a metal halide lamp (with cumulative luminous energy being 2,000 mJ/m$^2$). The cured coating film was found to have a storage elastic modulus of 182 MPa. It was colorless as defined in terms of the L*a*b* colorimetric system such that the L* value is 96%, the a* value is −2.0%, and the b* value is 6.9%. Moreover, it gave a score of 100/100 in cross-cut test.

Examples 2 to 9 and Comparative Examples 1 to 3

The same procedure as Example 1 was repeated except that the composition was changed as shown in Tables 1 to 4. The results are also shown in them.
IBXA: Isobornyl acrylate
LA: Dodecyl acrylate (lauryl acrylate)
Irgacure 1173: made by BASF Japan, Ltd.
Irgacure 369: made by BASF Japan, Ltd.
Irgacure 819: made by BASF Japan, Ltd.
Irgacure TPO: made by BASF Japan, Ltd.
Rheoloseal DM-30S: made by Tokuyama Corporation
X-22-174ASX: made by Shin-Etsu Chemical Co., Ltd.

TABLE 1

| Components (parts) | Example 2 | 3 | 4 | 5 | 6 |
|---|---|---|---|---|---|
| (A) Synthesis Example 1 | 100 | 100 | 100 | 100 | 100 |
| (A) Synthesis Example 5 | — | — | — | — | — |
| (B) IBXA | 100 | 100 | 100 | 100 | 100 |
| (B) LA | 100 | 100 | 100 | 100 | 100 |

Each of the amounts of the following components (C), (D), (E), and (G) is based on 100 parts of the total amounts of the above components (A) and (B).

| Components (parts) | 2 | 3 | 4 | 5 | 6 |
|---|---|---|---|---|---|
| (C) Irgacure 1173 | 3 | 3 | 3 | — | 3 |
| (C) Irgacure 369 | — | — | — | 1 | — |
| (C) Irgacure 819 | — | — | — | 1 | — |
| (C) Irgacure TPO | — | — | — | 1 | — |
| (D) Rheoloseal DM-30S | 6 | 6 | 6 | 6 | 6 |
| (E) Synthesis Example 7 | 5 | — | — | 1 | 1 |
| (E) Synthesis Example 9 | — | 1 | 5 | — | — |
| (G) X-22-174ASX | — | — | — | — | 5 |
| Viscosity (Pa · s) | 6 | 8 | 6 | 11 | 8 |
| Storage elastic modulus (MPa) | 156 | 169 | 155 | 191 | 149 |
| Cross-cut test (X/100) | 100 | 100 | 100 | 100 | 100 |

TABLE 2

| | Example | | | Comparative Example | | |
|---|---|---|---|---|---|---|
| Components (parts) | 7 | 8 | 9 | 1 | 2 | 3 |
| (A) Synthesis Example 1 | — | — | 100 | 100 | 100 | 100 |
| (A) Synthesis Example 5 | 100 | 100 | — | — | — | — |
| (B) IBXA | 100 | 100 | 100 | 100 | 100 | 100 |
| (B) LA | 100 | 100 | 100 | 100 | 100 | 100 |

Each of the amounts of the following components (C), (D), (E), and (G) is based on 100 parts of the total amounts of the above components (A) and (B).

| Components (parts) | 7 | 8 | 9 | 1 | 2 | 3 |
|---|---|---|---|---|---|---|
| (C) Irgacure 1173 | 3 | 3 | 3 | 3 | 3 | 3 |
| (C) Irgacure 369 | — | — | — | — | — | — |
| (C) Irgacure 819 | — | — | — | — | — | — |
| (C) Irgacure TPO | — | — | — | — | — | — |
| (D) Rheoloseal DM-30S | 6 | 6 | 10 | 6 | 6 | 6 |
| (E) Synthesis Example 6 | 1 | — | 1 | — | 10 | — |
| (E) Synthesis Example 8 | — | 1 | — | — | — | 10 |
| (G) X-22-174ASX | — | — | — | — | — | — |
| Viscosity (Pa · s) | 12 | 12 | 230 | 9 | 6 | 11 |
| Storage elastic modulus (MPa) | 143 | 136 | 350 | 168 | * | * |
| Cross-cut test (X/100) | 100 | 100 | 100 | 100 | 70 | 65 |

The compositions listed in Tables 1 and 2 above underwent peel strength test in the following way. The results are shown in the following tables.

high-density polyethylene (HDPE): made by Standard Test Piece, Inc.

polypropylene (PP): made by Standard Test Piece, Inc.

Nylon-6: made by Standard Test Piece, Inc.

[Method for Peel Strength Test]

Each of the compositions listed in the foregoing tables was made into a specimen in the form of truncated cone (measuring 3 mm in lower diameter, 2 mm in upper diameter, and 2 mm in height) on each of the substrates specified in Tables 3 to 5 below. After irradiation with ultraviolet rays (from a metal halide lamp) in nitrogen atmosphere at a dosage of 2,000 mJ/m$^2$, each specimen was examined for peel strength by means of a universal bond tester (4000 series, made by Nordson Advanced Technology K.K.).

TABLE 3

| Composition | Example 1 | | | Example 2 | | |
|---|---|---|---|---|---|---|
| Substrate | HDPE | PP | Nylon-6 | HDPE | PP | Nylon-6 |
| Peel strength (MPa) | 8.3 | 13.8 | 21.9 | 9.6 | 15.2 | 23.2 |

TABLE 4

| Composition | Example 3 | | | Example 7 | | |
|---|---|---|---|---|---|---|
| Substrate | HDPE | PP | Nylon-6 | HDPE | PP | Nylon-6 |
| Peel strength (MPa) | 7.4 | 13.9 | 22.2 | 6.9 | 10.8 | 17.3 |

TABLE 5

| Composition | Example 9 | | | Comparative Example 1 | | |
|---|---|---|---|---|---|---|
| Substrate | HDPE | PP | Nylon-6 | HDPE | PP | Nylon-6 |
| Peel strength (MPa) | 9.1 | 15.6 | 25.0 | 4.2 | 5.1 | 12.0 |

The samples of coating film formed from the compositions according to Example 6 and Comparative Example 1 were examined for the coefficient of kinetic friction in the following manner. The results are shown in Table 6.

[Coefficient of Kinetic Friction]

The coefficient of kinetic friction was measured in the following way. The silicone-modified polyimide resin is applied onto a glass plate, followed by curing. On the resulting coating film is placed a piece of wood free paper, which is subsequently moved under a load of 200 g at a rate of 0.3 m/minute by using a horizontal tensile tester, Model AGS-X (made by Shimadzu Corporation).

TABLE 6

| Composition (Coating film) | Example 6 | Comparative Example 1 |
|---|---|---|
| Coefficient of kinetic friction | 0.22 | 0.87 |

Example 10

RDW-R13 (red) made by Wako Pure Chemical Industries, Ltd. was added to the composition of Example 1 to obtain a red composition containing a silicone-modified polyimide resin. The content of RDW-R13 (red) is 0.005% by weight per 100 parts by weight of the dissolved product obtained in Example 1. The obtained a red composition containing a silicone-modified polyimide resin has a viscosity of 10 Pa·s. The composition was applied onto a Teflon (registered trademark) plate to form a 1-mm thick coating film thereon, which was subsequently cured by irradiation with ultraviolet rays (from a metal halide lamp) with a cumulative luminous energy of 1,000 mJ/m². The resulting red cured coating film was found to have a storage elastic modulus of 179 MPa, a red color defined by the L*a*b* colorimetric system such that L* is 84%, a* is 35.2%, and b* is −16.4%, and a score of 100/100 in cross-cut test.

Japanese Patent Application No. 2016-117586 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A silicone-modified polyimide resin composition of solvent free type which is fluid at 25° C. and free of solvent, the composition comprising:

(A) 100 parts by weight of a silicone-modified polyimide resin which is represented by the formula (1) below:

(1)

in the formula (1), E, F, and G are randomly bonded repeating units, E is a divalent residue derived from diamino-modified silicone represented by the formula (2) below, F is a residue derived from tetracarboxylic acid dianhydride represented by the formula (3) below, and G is a divalent residue derived from diamine, and the sum of e+f+g is 100 mol %, the molar ratio of f/(e+g) is from 0.8 to 1.2,

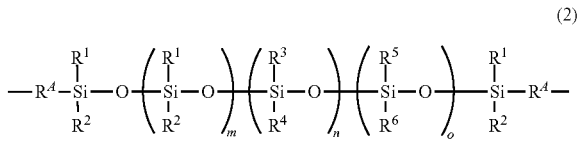

(2)

in the formula (2), $R^A$ is a substituted or unsubstituted divalent hydrocarbon group having 1 to 10 carbon atoms, $R^1$ and $R^2$ are each, independent from each other, a substituted or unsubstituted monovalent hydrocarbon group having 1 to 10 carbon atoms, $R^3$ and $R^4$ are each, independent from each other, a substituted or unsubstituted monovalent hydrocarbon group having 1 to 10 carbon atoms, $R^5$ and $R^6$ are each, independent from each other, an organic group selected from a substituted or unsubstituted alkyl group, aryl group, or aralkyl group, having 1 to 16 carbon atoms, and each of m, n, and o is an integer from 0 to 20, n+o≥1 and m+n+o=1 to 60,

(3)

in the formula (3), $I_m$ is a cyclic group having a cyclic imide structure at its end, and X is a single bond, oxygen, sulfur, sulfide group, sulfonic group, carbonyl group, —$NR^N$— (wherein $R^N$ is a straight, branched, or cyclic monovalent hydrocarbon group having 1 to 12 carbon atoms), —$CR^B_2$— (wherein $R^B$ is, independent form each other, a hydrogen atom or a substituted or unsubstituted monovalent hydrocarbon group having 1 to 12 carbon atoms), —$R^{Ar}_h$— (wherein $R^{Ar}$ is a divalent arylene group having 6 to 12 carbon atoms, and h is an integer of 1 to 6), a trivalent or tetravalent group derived from an arylene group with one or two hydrogen atoms eliminated, —$R^{Ar}_h(OR^{Ar})_i$— (wherein $R^{Ar}$ and h are defined as above and i is an integer of 1 to 5), a linear, branched, or cyclic alkylene group having 1 to 12 carbon atoms, a trivalent group derived from the alkylene group with one hydrogen atom eliminated, or a divalent to tetravalent organic group selected from arylenealkylene groups;

(B) a polymerizable compound: 100 to 2,000 parts by weight, (C) a polymerization initiator: 0.1 to 30 parts by weight per 100 parts by weight of the total content of the components (A) and (B), (D) a hydrophobic fumed silica: 1 to 50 parts by weight per 100 parts by weight of the total content of the components (A) and (B), and (E) an adhesion auxiliary agent: 0.1 to 5 parts by weight per 100 parts by weight of the total content of the components (A) and (B), wherein the component (E) is a compound represented by the formula (4) below:

(4)

in the formula (4), I is a monovalent unsaturated hydrocarbon group having a polymerizable group at each end and having 6 to 20 carbon atoms, J is a divalent siloxane unit represented by the formula (5), K is a divalent hydrocarbon group having 6 to 20 carbon atoms, and jk is an integer from 1 to 10,

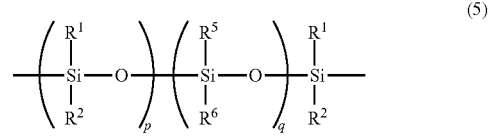

(5)

in the formula (5), $R^1$, $R^2$, $R^5$, and $R^6$ are defined as above, p is an integer from 1 to 60, and q is an integer from 0 to 60, with p+q≥1 and p+q=1 to 60.

2. The silicone-modified polyimide resin composition of solvent free type of claim 1, wherein $I_m$ is selected from the groups shown below:

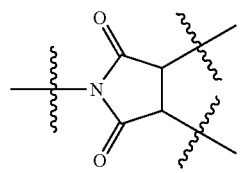

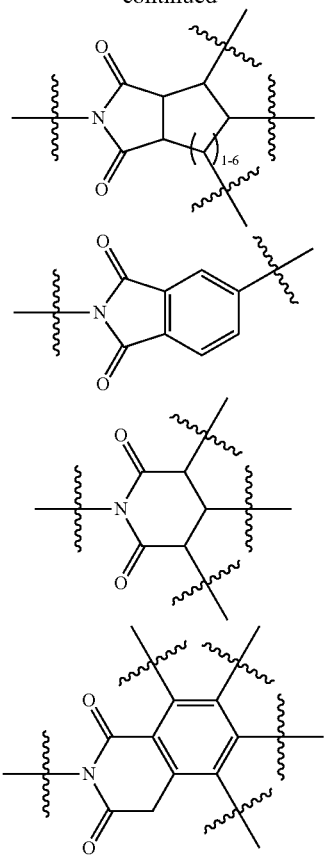

wherein the bonding hands marked with a wavy line function such that the one bonding to the nitrogen atom bonds to E or G and the other bonds to X.

3. The silicone-modified polyimide resin composition of solvent free type of claim 1, wherein the component (B) is a radical-polymerizable compound.

4. The silicone-modified polyimide resin composition of solvent free type of claim 3, wherein the component (B) is a (meth)acrylate ester compound.

5. The silicone-modified polyimide resin composition of solvent free type of claim 1, wherein the component (C) is a radical initiator capable of thermal decomposition or an initiator to be activated by irradiation.

6. The silicone-modified polyimide resin composition of solvent free type of claim 1, wherein the component (D) is hydrophobic fumed silica having a bulk density no higher than 1 g/mL, a mean primary particle diameter of from 1 to 100 nm, and a BET specific surface area of from 100 to 300 m$^2$/g.

7. The silicone-modified polyimide resin composition of solvent free type of claim 1, having a viscosity of from 3 to 1,000 Pa·s at 25° C.

8. The silicone-modified polyimide resin composition of solvent free type of claim 1, further comprising (F) a modifying additive.

9. The silicone-modified polyimide resin composition of solvent free type of claim 1, further comprising (G) a leveling agent.

10. The silicone-modified polyimide resin composition of solvent free type of claim 1, further comprising (H) a dye as the component.

11. An adhesive composed of the composition defined in claim 1.

12. A coating agent composed of the composition defined in claim 1.

13. A cured product of silicone-modified polyimide resin which is obtained by curing a silicone-modified polyimide resin-composition of solvent free type which is fluid at 25° C. and free of solvent, the composition comprising:

(A) 100 parts by weight of a silicone-modified polyimide resin which is represented by the formula (1) below:

$$E_e\text{-}F_f\text{-}G_g \tag{1}$$

in the formula (1), E, F, and G are randomly bonded repeating units, E is a divalent residue derived from diamino-modified silicone represented by the formula (2) below, F is a residue derived from tetracarboxylic acid dianhydride represented by the formula (3) below, and G is a divalent residue derived from diamine, and the sum of e+f+g is 100 mol %, the molar ratio of f/(e+g) is from 0.8 to 1.2,

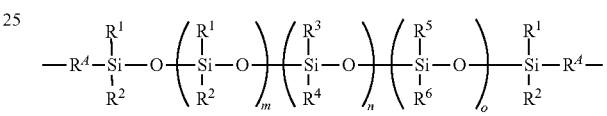

in the formula (2), R$^A$ is a substituted or unsubstituted divalent hydrocarbon group having 1 to 10 carbon atoms, R$^1$ and R$^2$ are each, independent from each other, a substituted or unsubstituted monovalent hydrocarbon group having 1 to 10 carbon atoms, R$^3$ and R$^4$ are each, independent from each other, a substituted or unsubstituted monovalent hydrocarbon group having 1 to 10 carbon atoms, R$^5$ and R$^6$ are each, independent from each other, an organic group selected from a substituted or unsubstituted alkyl group, aryl group, or aralkyl group, having 1 to 16 carbon atoms, and each of m, n, and o is an integer from 0 to 20, n+o 1 and m+n+o=1 to 60, $$\text{—I}_m\text{—X—I}_m\text{—} \tag{3}$$

in the formula (3), I$_m$ is a cyclic group having a cyclic imide structure at its end, and X is a single bond, oxygen, sulfur, sulfide group, sulfonic group, carbonyl group, —NR$^N$— (wherein R$^N$ is a straight, branched, or cyclic monovalent hydrocarbon group having 1 to 12 carbon atoms), —CR$^B_2$— (wherein R$^B$ is, independent form each other, a hydrogen atom or a substituted or unsubstituted monovalent hydrocarbon group having 1 to 12 carbon atoms), —R$^{Ar}_h$— (wherein R$^{Ar}$ is a divalent arylene group having 6 to 12 carbon atoms, and h is an integer of 1 to 6), a trivalent or tetravalent group derived from an arylene group with one or two hydrogen atoms eliminated, —R$^{Ar}_h$(OR$^{Ar}$)$_i$— (wherein R$^{Ar}$ and h are defined as above and i is an integer of 1 to 5), a linear, branched, or cyclic alkylene group having 1 to 12 carbon atoms, a trivalent group derived from the alkylene group with one hydrogen atom eliminated, or a divalent to tetravalent organic group selected from arylenealkylene groups;

(B) a polymerizable compound: 100 to 2,000 parts by weight, (C) a polymerization initiator: 0.1 to 30 parts by weight per 100 parts by weight of the total content of the components (A) and (B), (D) a hydrophobic fumed silica: 1 to 50 parts by weight per 100 parts by weight of the total content of the components (A) and (B), and (E) an adhesion auxiliary agent: 0.1 to 5 parts by weight per 100 parts by weight of the total content of the components (A) and (B), wherein the component (E) is a compound represented by the formula (4) below:

$$I-(J-K)_{jk}-J-I \qquad (4)$$

in the formula (4), I is a monovalent unsaturated hydrocarbon group having a polymerizable group at each end and having 6 to 20 carbon atoms, J is a divalent siloxane unit represented by the formula (5), K is a divalent hydrocarbon group having 6 to 20 carbon atoms, and jk is an integer from 1 to 10,

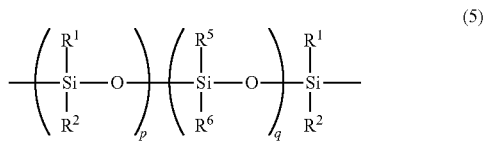

in the formula (5), $R^1$, $R^2$, $R^5$, and $R^6$ are defined as above, p is an integer from 1 to 60, and q is an integer from 0 to 60, with p+q≥1 and p+q=1 to 60, wherein said silicone-modified polyimide resin composition of solvent free type is cured with ultraviolet rays and/or visible rays, and wherein coating film formed by the cured product has a storage elastic modulus of from 1 to 500 MPa.

14. A cured product of silicone-modified polyimide resin which is obtained by curing a silicone-modified polyimide resin-composition of solvent free type which is fluid at 25° C. and free of solvent, the composition comprising:

(A) 100 parts by weight of a silicone-modified polyimide resin which is represented by the formula (1) below:

$$E_e\text{-}F_f\text{-}G_g \qquad (1)$$

in the formula (1), E, F, and G are randomly bonded repeating units, E is a divalent residue derived from diamino-modified silicone represented by the formula (2) below, F is a residue derived from tetracarboxylic acid dianhydride represented by the formula (3) below, and G is a divalent residue derived from diamine, and the sum of e+f+g is 100 mol %, the molar ratio of f/(e+g) is from 0.8 to 1.2,

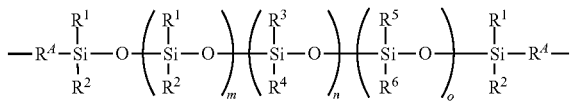

in the formula (2), $R^A$ is a substituted or unsubstituted divalent hydrocarbon group having 1 to 10 carbon atoms, $R^1$ and $R^2$ are each, independent from each other, a substituted or unsubstituted monovalent hydrocarbon group having 1 to 10 carbon atoms, $R^3$ and $R^4$ are each, independent from each other, a substituted or unsubstituted monovalent hydrocarbon group having 1 to 10 carbon atoms, $R^5$ and $R^6$ are each, independent from each other, an organic group selected from a substituted or unsubstituted alkyl group, aryl group, or aralkyl group, having 1 to 16 carbon atoms, and each of m, n, and o is an integer from 0 to 20, n+o≥1 and m+n+o=1 to 60, $$-I_m-X-I_m- \qquad (3)$$

in the formula (3), $I_m$ is a cyclic group having a cyclic imide structure at its end, and X is a single bond, oxygen, sulfur, sulfide group, sulfonic group, carbonyl group, $-NR^N-$ (wherein $R^N$ is a straight, branched, or cyclic monovalent hydrocarbon group having 1 to 12 carbon atoms), $-CR^B_2-$ (wherein $R^B$ is, independent form each other, a hydrogen atom or a substituted or unsubstituted monovalent hydrocarbon group having 1 to 12 carbon atoms), $-R^{Ar}_h-$ (wherein $R^{Ar}$ is a divalent arylene group having 6 to 12 carbon atoms, and h is an integer of 1 to 6), a trivalent or tetravalent group derived from an arylene group with one or two hydrogen atoms eliminated, $-R^{Ar}_h(OR^{Ar})_i-$ (wherein $R^{Ar}$ and h are defined as above and i is an integer of 1 to 5), a linear, branched, or cyclic alkylene group having 1 to 12 carbon atoms, a trivalent group derived from the alkylene group with one hydrogen atom eliminated, or a divalent to tetravalent organic group selected from arylenealkylene groups;

(B) a polymerizable compound: 100 to 2,000 parts by weight, (C) a polymerization initiator: 0.1 to 30 parts by weight per 100 parts by weight of the total content of the components (A) and (B), (D) a hydrophobic fumed silica: 1 to 50 parts by weight per 100 parts by weight of the total content of the components (A) and (B), and (E) an adhesion auxiliary agent: 0.1 to 5 parts by weight per 100 parts by weight of the total content of the components (A) and (B), wherein the component (E) is a compound represented by the formula (4) below:

$$I-(J-K)_{jk}-J-I \qquad (4)$$

in the formula (4), I is a monovalent unsaturated hydrocarbon group having a polymerizable group at each end and having 6 to 20 carbon atoms, J is a divalent siloxane unit represented by the formula (5), K is a divalent hydrocarbon group having 6 to 20 carbon atoms, and jk is an integer from 1 to 10,

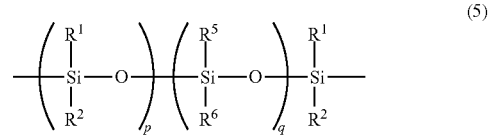

in the formula (5), $R^1$, $R^2$, $R^5$, and $R^6$ are defined as above, p is an integer from 1 to 60, and q is an integer from 0 to 60, with p+q≥1 and p+q=1 to 60, wherein said silicone-modified polyimide resin composition of solvent free type is cured with ultraviolet rays and/or visible rays, and wherein coating film formed by the cured product has a light transmittance at least 80% in the visible region and also has a color specified by the L*a*b* colorimetric system such that L* is at least 80%, a* is at least −10% and lower than 10%, and b* is at least −10% and lower than 10%.

* * * * *